US010219312B2

(12) United States Patent
Yang et al.

(10) Patent No.: US 10,219,312 B2
(45) Date of Patent: Feb. 26, 2019

(54) WAKEUP TECHNIQUES FOR IMPROVED CONNECTED MODE DISCONTINUOUS RECEPTION

(71) Applicant: QUALCOMM Incorporated, San Diego, CA (US)

(72) Inventors: Yue Yang, San Diego, CA (US); Aziz Gholmieh, Del Mar, CA (US); Srinivasan Balasubramanian, San Diego, CA (US); Ravi Agarwal, San Diego, CA (US); Gavin Bernard Horn, La Jolla, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/614,522

(22) Filed: Jun. 5, 2017

(65) Prior Publication Data
US 2018/0132292 A1  May 10, 2018

Related U.S. Application Data

(60) Provisional application No. 62/417,911, filed on Nov. 4, 2016.

(51) Int. Cl.
*H04W 16/18* (2009.01)
*H04W 76/18* (2018.01)
(Continued)

(52) U.S. Cl.
CPC ....... *H04W 76/18* (2018.02); *H04W 52/0216* (2013.01); *H04W 52/0229* (2013.01);
(Continued)

(58) Field of Classification Search
CPC ... H04W 76/28; H04W 72/042; H04W 72/14; H04W 72/1289; H04W 76/27;
(Continued)

(56) References Cited

U.S. PATENT DOCUMENTS

| 2008/0049669 | A1* | 2/2008 | Lundby | H04W 24/10 |
| | | | | 370/329 |
| 2013/0107782 | A1* | 5/2013 | Anas | H04W 72/1231 |
| | | | | 370/311 |

(Continued)

OTHER PUBLICATIONS

Ericsson: "A View on the DRX Enhancements in CELL_FACH", 3GPP Draft; R1-165332, A View on the DRX Enhancements in CELL_FACH, 3rd Generation Partnership Project (3GPP), Mobile Competence Centre; 650, Route Des Lucioles; F-06921 Sophia-Anti Polis Cedex; France, vol. RAN WG1, No. Nanjing, China; May 23, 2016-May 27, 2016, May 13, 2016, XP051096667, Retrieved from the Internet: URL:http://www.3gpp.org/ftp/tsg_ran/WG1_RL1/TSGR1_85/Docs/ [retrieved on May 13, 2016], 4 pages.

(Continued)

*Primary Examiner* — Daniel Lai
(74) *Attorney, Agent, or Firm* — Holland & Hart LLP

(57) ABSTRACT

Techniques are described for wireless communication. A base station may indicate to a UE, in a pre-wakeup period, whether the base station will transmit a grant to the UE. The pre-wakeup period may occur at the beginning of a DRX cycle. The base station may transmit an indication of a grant to the UE, and the base station may indicate a time period during which the UE may wake up to receive the grant. The indication may include scheduling information for the grant. The UE may select a DRX mode based on a configuration received from the base station, a traffic pattern, or scheduling history. The UE may monitor for the grant, and receive the grant. In other examples, the UE or the base station may
(Continued)

identify that the grant was not received, and may reset a DRX cycle based on the identification.

29 Claims, 25 Drawing Sheets

(51) Int. Cl.
| | |
|---|---|
| *H04W 76/10* | (2018.01) |
| *H04W 76/28* | (2018.01) |
| *H04W 52/02* | (2009.01) |
| *H04W 8/00* | (2009.01) |
| *H04W 84/18* | (2009.01) |

(52) U.S. Cl.
CPC .......... *H04W 76/10* (2018.02); *H04W 76/28* (2018.02); *H04W 8/005* (2013.01); *H04W 84/18* (2013.01)

(58) Field of Classification Search
CPC . H04W 72/04; H04W 68/02; H04W 72/1278; H04W 76/00; H04W 76/18; H04W 76/10; H04W 76/02; H04W 76/027; H04W 84/18; H04W 8/005; H04W 72/0446; H04W 88/08; H04W 74/006; H04W 88/02; H04W 72/0406; H04W 72/12; H04W 52/0216; H04W 24/10; H04W 52/0229; H04W 72/02; H04W 72/0453; H04W 28/0278; H04W 72/1205; H04W 36/0072; H04W 72/044; H04W 72/1242; H04W 72/1263; H04W 72/1273; H04W 72/1294; H04W 24/02; H04W 28/06; H04W 52/0209; H04W 52/0235; H04W 52/0251; H04W 52/28; H04W 56/00; H04W 56/001; H04W 56/0045; H04W 72/00; H04W 72/0486; H04W 72/0493; H04W 72/082; H04W 72/1226; H04W 74/04

See application file for complete search history.

(56) References Cited

U.S. PATENT DOCUMENTS

| | | | | |
|---|---|---|---|---|
| 2014/0056198 A1* | 2/2014 | Quan | ................ | H04W 52/0216 370/311 |
| 2014/0064160 A1* | 3/2014 | Verger | ................ | H04W 72/14 370/311 |
| 2014/0198699 A1* | 7/2014 | Makharia | .......... | H04W 52/0216 370/311 |
| 2015/0092893 A1* | 4/2015 | Tabet | ................ | H04L 27/2649 375/340 |
| 2016/0183189 A1* | 6/2016 | Merlin | ............ | H04W 52/0219 370/311 |
| 2017/0265136 A1* | 9/2017 | Elsayed | ............ | H04W 52/0229 |

OTHER PUBLICATIONS

Ericsson: "On Incorporating the DL Scheduling Notification Based on Regular HS-SCCH Control Information to the New Power Saving Mechanism in CELL_FACH", 3GPP Draft; R1-167764 Information Conveyed on the Regular HS-SCCH, 3rd Generation Partnership Project (3GPP), Mobile Competence Centre; 650, Route Des Lucioles; F-06921 Sophia-Anti Polis Cedex; France, vol. RAN WG1, No. Gothenburg, Sweden; Aug. 22, 2016-Aug. 26, 2016 Aug. 12, 2016, XP051132657, Retrieved from the Internet: URL:http://www.3gpp.org/ftp/tsg_ran/WG1_RL1/TSGR1_86/Docs/ [retrieved on Aug. 12, 2016], 4 pages.

Ericsson: "On the DRX Enhancements in CELL_FACH", 3GPP Draft; R1-163195, 3rd Generation Partnership Project (3GPP), Mobile Competence Centre; 650, Route Des Lucioles; F-06921 Sophia-Anti Polis Cedex; France, vol. RAN WG1, No. Busan, Korea; Apr. 11, 2016-Apr. 15, 2016 Apr. 1, 2016, XP051079884, Retrieved from the Internet: URL:http://www.3gpp.org/ftp/tsg_ran/WG1_RL1/TSGR1_84b/Docs/ [retrieved on Apr. 1, 2016], 4 pages.

Huawei et al., "Considerations on DRX in CELL_FACH", 3GPP Draft; R1-167682, 3rd Generation Partnership Project (3GPP), Mobile Competence Centre; 650, Route Des Lucioles; F-06921 Sophia-Anti Polis Cedex; France, vol. RAN WG1, No. Gothenburg, Sweden; Aug. 22, 2016-Aug. 26, 2016 Aug. 21, 2016, XP051126025, Retrieved from the Internet: URL:http://www.3gpp.org/ftp/Meetings_3GPP_SYNC/RAN1/Docs/ [retrieved on Aug. 21, 2016], 3 pages.

International Search Report and Written Opinion—PCT/US2017/056654—ISA/EPO—dated Feb. 15, 2018.

QUALCOMM: "Enhanced CELL_FACH DRX Operation for Improved UE Battery", 3GPP Draft; R1-160341, 3rd Generation Partnership Project (3GPP), Mobile Competence Centre; 650, Route Des Lucioles; F-06921 Sophia-Anti Polis Cedex; France, vol. RAN WG1, No. St. Julian's, Malta; Feb. 15, 2016-Feb. 19, 2016 Feb. 6, 2016, XP051064157, Retrieved from the Internet: URL:http://www.3gpp.org/ftp/tsg_ran/WG1_RL1/TSGR1_84/Docs/ [retrieved on Feb. 6, 2016], 2 pages.

QUALCOMM: "Further Discussions on HS-SCCH DRX Lite Proposal", 3GPP Draft; R1-162239, Further Discussions on HS-SCCH DRX Lite Proposal, 3rd Generation Partnership Project (3GPP), Mobile Competence Centre; 650, Route Des Lucioles; F-06921 Sophia-Anti Polis Cedex; France, vol. RAN WG1, No. Busan, South Korea; Apr. 10, 2016-Apr. 14, 2016, Apr. 2, 2016, XP051079947, Retrieved from the Internet: URL:http://www.3gpp.org/ftp/tsg_ran/WG1_RL1/TSGR1_84b/Docs/ [retrieved on Apr. 2, 2016], 3 pages.

* cited by examiner

WAKEUP TECHNIQUES FOR IMPROVED CONNECTED MODE DISCONTINUOUS RECEPTION

CROSS REFERENCES

The present application for patent claims priority to U.S. Provisional Patent Application No. 62/417,911 by YANG, et al., entitled "Wakeup Techniques For Improved Connected Mode Discontinuous Reception," filed Nov. 4, 2016, assigned to the assignee hereof, and which is hereby expressly incorporated by reference herein in its entirety.

INTRODUCTION

The following relates generally to wireless communication, and more specifically to wakeup techniques for improved connected mode discontinuous reception.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A UE operating in a discontinuous reception (DRX) mode may wake up at the beginning of each DRX cycle to check for a grant received from a base station, for example in a downlink control region of a downlink transmission. The UE may still wake up to check for the downlink message, even if the base station does not send a grant to the UE. The UE may also remain awake during portions of the DRX cycle, even without having received a grant. The UE waking up and going back to sleep, or remaining awake unnecessarily, may result in power waste and poor battery performance.

SUMMARY

A method of wireless communication is described. The method may include identifying that a buffer contains data for transmission to a UE, transmitting, to the UE and based at least in part on the identifying, an indication that a grant of resources will be subsequently transmitted to the UE, and transmitting, to the UE while the UE is in a discontinuous reception state, the grant of resources following the transmission of the indication.

An apparatus for wireless communication is described. The apparatus may include means for identifying that a buffer contains data for transmission to a UE, means for transmitting, to the UE and based at least in part on the identifying, an indication that a grant of resources will be subsequently transmitted to the UE, and means for transmitting, to the UE while the UE is in a discontinuous reception state, the grant of resources following the transmission of the indication.

Another apparatus for wireless communication is described. The apparatus may include a processor, memory in electronic communication with the processor, and instructions stored in the memory. The instructions may be operable to cause the processor to identify that a buffer contains data for transmission to a UE, transmit, to the UE and based at least in part on the identifying, an indication that a grant of resources will be subsequently transmitted to the UE, and transmit, to the UE while the UE is in a discontinuous reception state, the grant of resources following the transmission of the indication.

A non-transitory computer readable medium for wireless communication is described. The non-transitory computer-readable medium may include instructions operable to cause a processor to identify that a buffer contains data for transmission to a UE, transmit, to the UE and based at least in part on the identifying, an indication that a grant of resources will be subsequently transmitted to the UE, and transmit, to the UE while the UE is in a discontinuous reception state, the grant of resources following the transmission of the indication.

In some examples of the method, apparatus, and non-transitory computer-readable medium described above, the indication that the grant of resources will be subsequently transmitted to the UE and the grant of resources may be transmitted during the same discontinuous reception cycle.

Some examples of the method, apparatus, and non-transitory computer-readable medium described above may further include processes, features, means, or instructions for determining to schedule the UE during a discontinuous reception cycle. Some examples of the method, apparatus, and non-transitory computer-readable medium described above may further include processes, features, means, or instructions wherein the indication indicates that the UE may be to wake up for a duration of time.

Some examples of the method, apparatus, and non-transitory computer-readable medium described above may further include processes, features, means, or instructions for determining to schedule the UE during a discontinuous reception cycle. Some examples of the method, apparatus, and non-transitory computer-readable medium described above may further include processes, features, means, or instructions wherein the indication indicates a time for the UE to wake up to listen for the grant of resources.

In some examples of the method, apparatus, and non-transitory computer-readable medium described above, the indication indicates that the UE may be to wake up for a duration of time.

Some examples of the method, apparatus, and non-transitory computer-readable medium described above may further include processes, features, means, or instructions for determining a discontinuous reception mode for the UE to use to receive transmissions from the base station. Some examples of the method, apparatus, and non-transitory computer-readable medium described above may further include processes, features, means, or instructions for transmitting, to the UE, a mode indicator indicating the determined discontinuous reception mode.

Some examples of the method, apparatus, and non-transitory computer-readable medium described above may further include processes, features, means, or instructions for identifying a set of UEs from among a plurality of UEs. Some examples of the method, apparatus, and non-transitory computer-readable medium described above may further include processes, features, means, or instructions for transmitting a group indication that one or more grants of resources will be transmitted for the identified set of UEs.

Some examples of the method, apparatus, and non-transitory computer-readable medium described above may further include processes, features, means, or instructions for identifying the set of UEs may be based at least in part on an amount of data for transmission associated with respective buffers associated with each of the set of UEs.

Some examples of the method, apparatus, and non-transitory computer-readable medium described above may further include processes, features, means, or instructions for transmitting the indication that the grant of resources will be transmitted to the UE in a beginning subframe of a discontinuous reception cycle.

Another method of wireless communication is described. The method may include receiving, from a base station while the UE is in a discontinuous reception state, an indication that a grant of resources will be transmitted by the base station to the UE, monitoring for the grant of resources based at least in part on receiving the indication that the grant of resources will be transmitted, and receiving the grant of resources from the base station.

Another apparatus for wireless communication is described. The apparatus may include means for receiving, from a base station while the UE is in a discontinuous reception state, an indication that a grant of resources will be transmitted by the base station to the UE and means for monitoring for the grant of resources based at least in part on receiving the indication that the grant of resources will be transmitted, and receiving the grant of resources from the base station.

Another apparatus for wireless communication is described. The apparatus may include a processor, memory in electronic communication with the processor, and instructions stored in the memory. The instructions may be operable to cause the processor to receive, from a base station while the UE is in a discontinuous reception state, an indication that a grant of resources will be transmitted by the base station to the UE and monitor for the grant of resources based at least in part on receiving the indication that the grant of resources will be transmitted.

Another non-transitory computer readable medium for wireless communication is described. The non-transitory computer-readable medium may include instructions operable to cause a processor to receive, from a base station while the UE is in a discontinuous reception state, an indication that a grant of resources will be transmitted by the base station to the UE and monitor for the grant of resources based at least in part on receiving the indication that the grant of resources will be transmitted.

In some examples of the method, apparatus, and non-transitory computer-readable medium described above, the indication that the grant of resources will be transmitted by the base station and the grant of resources may be received during the same discontinuous reception cycle.

Some examples of the method, apparatus, and non-transitory computer-readable medium described above may further include processes, features, means, or instructions for entering an on state of the discontinuous reception state based at least in part on the received indication that the grant of resources will be transmitted, or identifying the presence of data to be transmitted on a downlink or an uplink, or a combination thereof. Some examples of the method, apparatus, and non-transitory computer-readable medium described above may further include processes, features, means, or instructions for monitoring for the indicated grant of resources during the on state.

Some examples of the method, apparatus, and non-transitory computer-readable medium described above may further include processes, features, means, or instructions for receiving the grant of resources. Some examples of the method, apparatus, and non-transitory computer-readable medium described above may further include processes, features, means, or instructions for resetting a discontinuous reception inactivity timer based at least in part on receiving the grant of resources.

Some examples of the method, apparatus, and non-transitory computer-readable medium described above may further include processes, features, means, or instructions for resetting a discontinuous reception cycle timer based at least in part on receiving the indication that the grant of resources will be transmitted, or identifying the presence of data to be transmitted on a downlink or an uplink, or a combination thereof.

Some examples of the method, apparatus, and non-transitory computer-readable medium described above may further include processes, features, means, or instructions for switching between a first discontinuous reception mode associated with the discontinuous reception state and a second discontinuous reception mode.

Some examples of the method, apparatus, and non-transitory computer-readable medium described above may further include processes, features, means, or instructions for identifying a traffic pattern for the UE. Some examples of the method, apparatus, and non-transitory computer-readable medium described above may further include processes, features, means, or instructions for switching between the first discontinuous reception mode and the second discontinuous reception mode based at least in part on the identified traffic pattern.

Another method of wireless communication is described. The method may include identifying that a buffer contains data for transmission to a UE, transmitting, to the UE and based at least in part on the identifying, an indication that a grant of resources will be subsequently transmitted to the UE, and resetting a discontinuous reception cycle timer based at least in part on identifying that the grant of resources indicated by the transmitted indication was not received by the UE.

Another apparatus for wireless communication is described. The apparatus may include means for identifying that a buffer contains data for transmission to a UE, means for transmitting, to the UE and based at least in part on the identifying, an indication that a grant of resources will be subsequently transmitted to the UE, and means for resetting a discontinuous reception cycle timer based at least in part on identifying that the grant of resources indicated by the transmitted indication was not received by the UE.

Another apparatus for wireless communication is described. The apparatus may include a processor, memory in electronic communication with the processor, and instructions stored in the memory. The instructions may be operable to cause the processor to identify that a buffer contains data for transmission to a UE, transmit, to the UE and based at least in part on the identifying, an indication that a grant of resources will be subsequently transmitted to the UE, and reset a discontinuous reception cycle timer based at least in part on identifying that the grant of resources indicated by the transmitted indication was not received by the UE.

Another non-transitory computer readable medium for wireless communication is described. The non-transitory computer-readable medium may include instructions operable to cause a processor to identify that a buffer contains data for transmission to a UE, transmit, to the UE and based at least in part on the identifying, an indication that a grant of resources will be subsequently transmitted to the UE, and reset a discontinuous reception cycle timer based at least in part on identifying that the grant of resources indicated by the transmitted indication was not received by the UE.

In some examples of the method, apparatus, and non-transitory computer-readable medium described above, resetting the discontinuous reception cycle timer further comprises: initiating a short discontinuous reception cycle based at least in part on identifying that the grant of resources indicated by the transmitted indication was not received by the UE.

In some examples of the method, apparatus, and non-transitory computer-readable medium described above, resetting the discontinuous reception cycle timer further comprises: initiating a long discontinuous reception cycle based at least in part on identifying that the grant of resources indicated by the transmitted indication was not received by the UE.

In some examples of the method, apparatus, and non-transitory computer-readable medium described above, identifying that the grant of resources indicated by the transmitted indication was not received by the UE comprises: identifying, at the base station, that the grant of resources indicated by the transmitted indication was not transmitted by the base station.

In some examples of the method, apparatus, and non-transitory computer-readable medium described above, identifying that the grant of resources indicated by the transmitted indication was not received by the UE comprises: receiving an indication from the UE that the grant of resources indicated by the transmitted indication was not received by the UE.

In some examples of the method, apparatus, and non-transitory computer-readable medium described above, the indication that the grant of resources will be subsequently transmitted to the UE and the grant of resources may be transmitted during the same discontinuous reception cycle.

In some examples of the method, apparatus, and non-transitory computer-readable medium described above, the indication indicates that the UE may be to wake up for a duration of time.

Some examples of the method, apparatus, and non-transitory computer-readable medium described above may further include processes, features, means, or instructions for determining a discontinuous reception mode for the UE to use to receive transmissions from the base station. Some examples of the method, apparatus, and non-transitory computer-readable medium described above may further include processes, features, means, or instructions for transmitting, to the UE, a mode indicator indicating the determined discontinuous reception mode.

Another method of wireless communication is described. The method may include receiving, from a base station while the UE is in a discontinuous reception state, an indication that a grant of resources will be transmitted by the base station to the UE, monitoring for the grant of resources based at least in part on receiving the indication that the grant of resources will be transmitted, identifying that the grant of resources indicated by the received indication was not received by the UE, and resetting a discontinuous reception cycle timer based at least in part on the identification.

Another apparatus for wireless communication is described. The apparatus may include means for receiving, from a base station while the UE is in a discontinuous reception state, an indication that a grant of resources will be transmitted by the base station to the UE, means for monitoring for the grant of resources based at least in part on receiving the indication that the grant of resources will be transmitted, means for identifying that the grant of resources indicated by the received indication was not received by the UE, and means for resetting a discontinuous reception cycle timer based at least in part on the identification.

Another apparatus for wireless communication is described. The apparatus may include a processor, memory in electronic communication with the processor, and instructions stored in the memory. The instructions may be operable to cause the processor to receive, from a base station while the UE is in a discontinuous reception state, an indication that a grant of resources will be transmitted by the base station to the UE, monitor for the grant of resources based at least in part on receiving the indication that the grant of resources will be transmitted, identify that the grant of resources indicated by the received indication was not received by the UE, and reset a discontinuous reception cycle timer based at least in part on the identification.

Another non-transitory computer readable medium for wireless communication is described. The non-transitory computer-readable medium may include instructions operable to cause a processor to receive, from a base station while the UE is in a discontinuous reception state, an indication that a grant of resources will be transmitted by the base station to the UE, monitor for the grant of resources based at least in part on receiving the indication that the grant of resources will be transmitted, identify that the grant of resources indicated by the received indication was not received by the UE, and reset a discontinuous reception cycle timer based at least in part on the identification.

In some examples of the method, apparatus, and non-transitory computer-readable medium described above, resetting the discontinuous reception cycle timer further comprises: initiating a short discontinuous reception cycle based at least in part on the identification.

In some examples of the method, apparatus, and non-transitory computer-readable medium described above, resetting the discontinuous reception cycle timer further comprises: initiating a long discontinuous reception cycle based at least in part on the identification.

Some examples of the method, apparatus, and non-transitory computer-readable medium described above may further include processes, features, means, or instructions for identifying a traffic pattern for the UE. Some examples of the method, apparatus, and non-transitory computer-readable medium described above may further include processes, features, means, or instructions for switching between a first discontinuous reception mode associated with the discontinuous reception state and a second discontinuous reception mode based at least in part on the identified traffic pattern.

Some examples of the method, apparatus, and non-transitory computer-readable medium described above may further include processes, features, means, or instructions for determining that the base station transmitted data to the UE during a preceding discontinuous reception cycle according to a first discontinuous reception mode. Some examples of the method, apparatus, and non-transitory computer-readable medium described above may further include processes, features, means, or instructions for operating in the first discontinuous reception mode in a current discontinuous reception cycle based at least in part on the determination.

DETAILED DESCRIPTION

Figure 1:
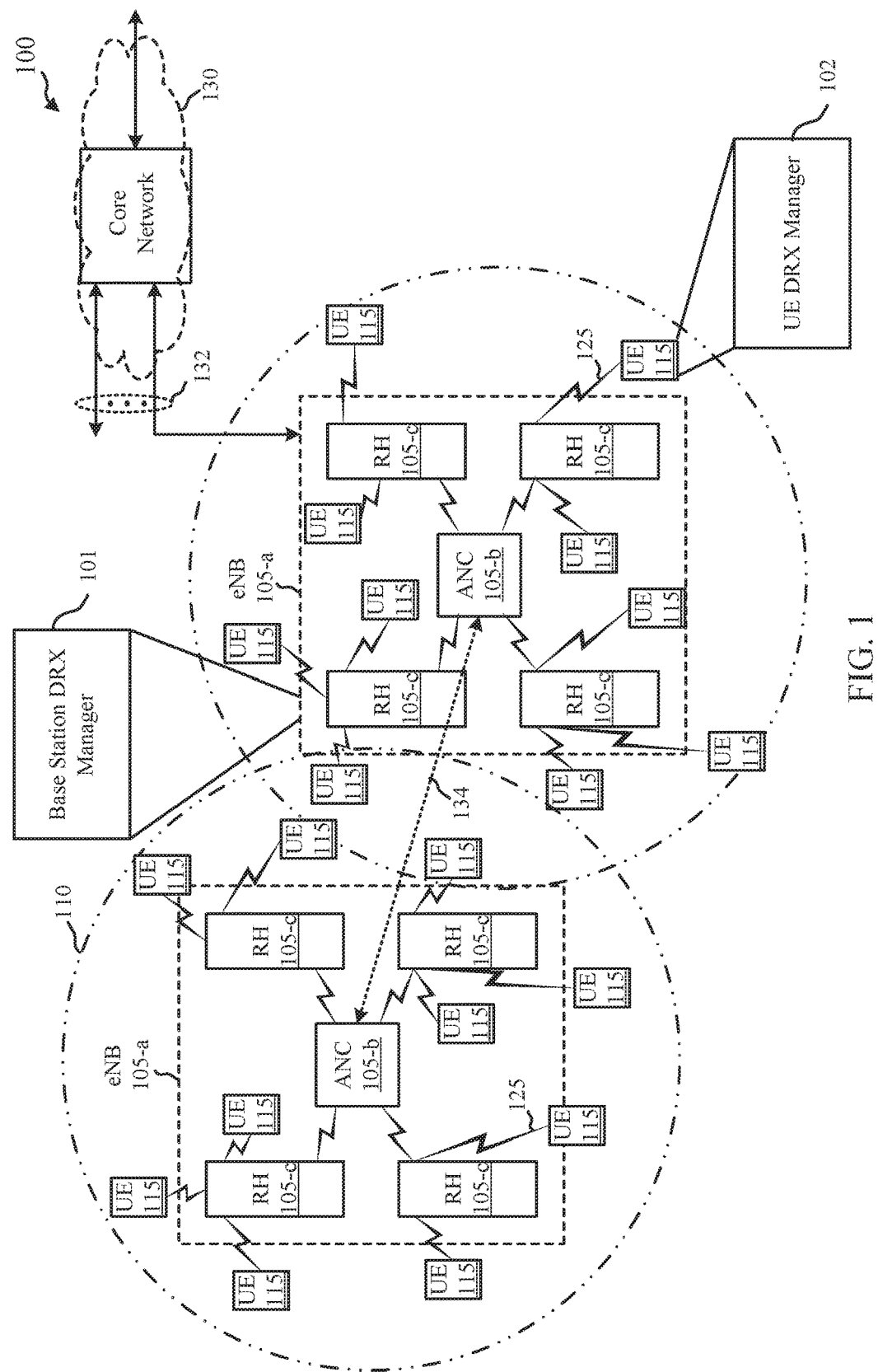
FIG. 1 illustrates an example of a system for wireless communication that supports wakeup techniques for improved connected mode discontinuous reception, in accordance with one or more aspects of the present disclosure.

A UE operating in a DRX mode may wake up at the beginning of each DRX cycle to check for a grant from a base station. If the base station has buffered data for the UE, the base station may indicate to the UE resources that have been allocated by the base station for data transmissions to the UE by transmitting a grant to the UE at the start of the DRX cycle. In particular, the grant may be transmitted within a control region of a subframe at the beginning of the DRX cycle, such as in a physical downlink control channel (PDCCH) for the UE. However, even if the base station does not transmit a grant for the UE, the UE may still wake up at the beginning of each DRX cycle to check for such a grant or remain in an awake state listening for such a grant. The UE repeatedly waking up and going to sleep, or remaining awake, during the DRX cycles, in some cases without receiving a grant, may lead to inefficiencies, such as wasted power and energy for the UE.

Therefore, the base station may indicate to the UE, in a pre-wakeup period, whether the base station will transmit a grant. The indication of the grant of resources and the grant itself may be within the same DRX cycle, or may be in different DRX cycles. The pre-wakeup period may occur at the beginning of a DRX cycle, which may be during a portion of a first subframe of a DRX cycle in some examples. The base station may transmit an indication of a grant to the UE, and the base station may indicate a time period during which the UE may receive the grant. In some examples, the indication may include scheduling information for the grant (e.g., an explicit indication of precisely when and/or in what resources the grant will be transmitted), or the indication may include a time period during which the UE may wake up to receive a grant.

In some examples, the base station may indicate a grant to the UE during a wake-up period of a DRX cycle, but the base station may not be able to transmit the grant, for example due to excess loading of the base station. Therefore, in some examples, the base station may transmit an indication of a grant if the base station can transmit the grant during the DRX cycle. A UE may have wake-up periods at the beginning of short DRX cycles and/or long DRX cycles. In some example, the UE may be configured to switch between short DRX cycles and long DRX cycles. In still other examples, the UE and/or base station may switch between operating in a DRX mode that uses wake-up periods as described above and operating in one or more other DRX modes (e.g., one or more legacy DRX modes).

In some cases, the UE may receive the indication of a grant during the wake-up period. Then the UE may monitor for the indicated grant of resources, and may then receive the grant during the DRX cycle. In some cases, however, the UE may receive the indication of a grant during the wake-up period, but may not receive the indicated grant. In such cases, the UE or the base station may reset a DRX cycle timer based on identifying that the grant of resources indicated by the transmitted indication was not received by the UE. The UE or base station may initiate a short DRX cycle or a long DRX cycle after identifying that the grant was not received, for example by moving into the short DRX cycle, or going back into a long DRX cycle.

Aspects of the disclosure are initially described in the context of a wireless communications system. Further examples are provided of different wakeup techniques using a grant indication during a wakeup period for a UE operating in a DRX mode. Aspects of the disclosure are further illustrated by and described with reference to apparatus diagrams, system diagrams, and flowcharts that relate to wakeup techniques for improved connected mode discontinuous reception.

FIG. 1 illustrates an example of a wireless communications system 100 that supports wakeup techniques for improved connected mode discontinuous reception, in accordance with various aspects of the present disclosure. The wireless communications system 100 includes base stations 105 (e.g., gNodeBs (gNBs), and/or radio heads (RHs)), UEs 115, and a core network 130. Wireless communications system 100 may support pre-wakeup indication of grants in DRX mode to allow for reduced power consumption.

Base stations 105 may wirelessly communicate with UEs 115 via one or more base station antennas. Each base station 105 may provide communication coverage for a respective geographic coverage area 110. Wireless communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. A UE 115 may communicate with the core network 130 through communication link 135. UEs 115 may be dispersed throughout the wireless communications system 100, and each UE 115 may be stationary or mobile.

Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one packet data network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as base station 105-a may include subcomponents such as an access network entity 105-b, which may be an example of an access node controller (ANC). Each access network entity 105-b may communicate with a number of UEs 115 through a number of other access network entities 105-c, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, a UE 115 may monitor a wireless communication link 125 continuously for an indication that the UE 115 may receive data. In other cases (e.g., to conserve power and extend battery life) a UE 115 may be configured to operate using one or more DRX cycles. A DRX cycle includes an "on duration" when the UE 115 may monitor for control information (e.g., on a PDCCH) and a "DRX period" when the UE 115 may power down radio components. In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle and continuous reception may be controlled by an internal timer (e.g., internal to UE 115) or by messaging received from a base station 105. A UE 115 may receive scheduling messages on a PDCCH during the on duration. While monitoring PDCCH for a scheduling message, the UE 115 may initiate a DRX inactivity timer. If a scheduling message is successfully received, the UE 115 may prepare to receive data and the DRX inactivity timer may be reset. When the DRX inactivity timer expires without receiving a scheduling message, the UE 115 may move into a short DRX cycle and may start a DRX short cycle timer. When the DRX short cycle timer expires, the UE 115 may resume a long DRX cycle.

One or more of base station 105 may include a base station DRX manager 101, which may identify that a buffer of the base station 105 contains data for transmission to a UE 115. Base station DRX manager 101 may then transmit an indication that a grant of resources will be subsequently transmitted to the UE based on identifying the data in the buffer. Following the indication that the grant will be transmitted, the base station DRX manager 101 may transmit, while the UE is in a DRX station, the indicated grant of resources. The grant of resources may be sent in the same or a different DRX cycle as the indication of the grant.

UEs 115 may include a UE DRX manager 102, which may receive an indication that the UE 115 will receive a grant of resources from a base station 105 while the UE 115 is in a DRX state. The UE DRX manager 102 may then monitor for the grant of resources based on receiving the indication that the grant of resources will be transmitted. The UE DRX manager 102 may receive the indication of the grant of resources in the same or in different DRX cycles as the grant of resources itself.

Wireless communications system 100 may operate in an ultra high frequency (UHF) frequency region using frequency bands from 700 MHz to 2600 MHz (2.6 GHz), although in some cases wireless local area networks (WLANs) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station) and a receiver (e.g. a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a base station 105-c, access network entity 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each frequency division multiple access (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with CCs operating in a licensed band. Operations in unlicensed spectrum may include downlink transmissions, uplink transmissions, or both. Duplexing in unlicensed spectrum may be based on FDD, TDD or a combination of both.

Figure 2:
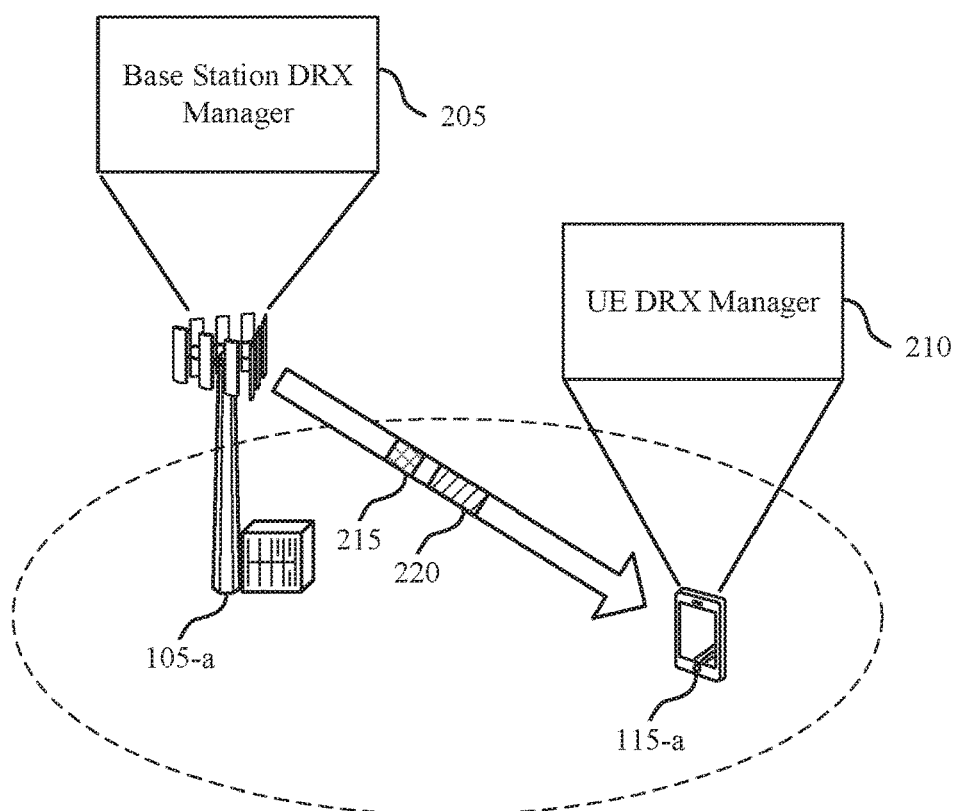
FIG. 2 illustrates an example of a wireless communications system that supports wakeup techniques for improved connected mode discontinuous reception, in accordance with one or more aspects of the present disclosure.

FIG. 2 shows a wireless communications system 200 that supports wakeup techniques for improved connected mode discontinuous reception in accordance with various aspects of the present disclosure. By way of example, base station 105-a may identify buffered data for UE 115-a and transmit an indication of a grant 215 to UE 115-a. UE 115-a may wake up based on the indication of the grant 215 to receive a grant 220. UE 115-a and base station 105-a may be respective examples of a UE 115 and a base station 105 as described herein with reference to FIG. 1.

Base station 105-a and UE 115-a may include base station DRX manager 205 and UE DRX manager 210, respectively. Base station DRX manager 205 may be used to indicate a grant 220 to UE 115-a. UE DRX manager 210 may be used to receive the indication of the grant 215, and wake up UE 115-a to receive the grant 220. UE DRX manager 210 may be an example of a UE DRX manager 1415 described with reference to FIG. 13. Base station DRX manager 205 may be an example of a base station DRX manager 1215 described with reference to FIG. 12.

Base station 105-a may identify buffered data for UE 115-a, which may operate in a DRX mode. Base station 105-a may transmit an indication of a grant 220 for the buffered data to UE 115-a during a pre-wakeup period. UE 115-a may periodically check for the indications of the grant 220 in pre-wakeup periods. The pre-wakeup period may occur at the start of a DRX cycle, such as a short DRX cycle or a long DRX cycle. The indication of the grant 215 may include scheduling information for the grant 220 or an indication of an "ON period," during which the UE may wake up and prepare to receive the grant. UE 115-a may return to sleep after receiving the grant 220 until another pre-wakeup period, or the start of another DRX cycle.

In some examples, base station 105-a may transmit an indication of a grant 220 and scheduling information for the grant 220 to UE 115-a. Base station 105-a may transmit the indication of the grant 215 to UE 115-a during a pre-wakeup period. Base station 105-a may include scheduling information for the grant 220, or other information identification resources that the base station 105-a will use to transmit the grant 220 to UE 115-a, in the indication of the grant 215. UE 115-a may wake up based on the scheduling information to receive the grant 220. UE 115-a may reset a DRX inactivity timer after receiving the grant 220, returning UE 115-a to sleep. In some examples, base station 105-a may not have pending data for UE 115-a at the beginning of the DRX cycle, such that UE 115-a may go to sleep. If base station 105-a does not have pending data for UE 115-a at the beginning of the DRX cycle, base station 105-a may not schedule a grant 220 for UE 115-a until a following DRX cycle. Indicating scheduling information to UE 115-a with the indication of the grant 215 may reduce UE power usage, as UE 115-a may only wake up to receive the indication.

In some examples, UE 115-a may wake up based on the indication or scheduling information to receive the grant 220. However, the UE may not receive the grant 220. For example, base station 105-a may fail to transmit grant 220, or interference, fading, or poor signal quality may affect grant 220 to the extent that UE 115-a cannot receive the signal, or UE 115-a may fail to properly decode the grant. In such cases, UE 115-a may determine that the indicated grant 220 has not be received, and may reset a DRX inactivity timer, returning UE 115-a to sleep. UE 115-a may initiate or revert to a long DRX inactivity timer, or may initiate a short DRX inactivity timer. Additionally or alternatively, base station 105-a may determine that the indicated grant was not received by UE 115-a, for example because base station 105-a did not transmit the grant or UE 115-a provided an indication to base station 105-a that such grant was not received by UE 115-a. Base station 105-a may then reset its DRX inactivity timer after receiving the grant 220. Base station 105-a may initiate or revert to a long DRX inactivity timer, or may initiate a short DRX inactivity timer.

In some examples, base station 105-a may indicate an on duration to UE 115-a during a pre-wakeup period. Base station 105-a may identify pending data for UE 115-a and transmit an indication of a grant 220 for the data to UE 115-a during the pre-wakeup period. UE 115-a may identify the on duration indication and wake up for the on duration. If UE 115-a receives the grant 220, UE 115-a may reset a DRX inactivity timer, which may allow UE 115-a to return to sleep after receiving the grant 220 instead of remaining active for the rest of the on duration. In some examples, UE 115-a may reset a DRX short cycle timer if UE 115-a resets the DRX short cycle timer, UE 115-a may remain in a short DRX cycle (e.g., may not enter a long DRX cycle) if base station 105-a has pending data. In some examples, base station 105-a may not have pending data for UE 115-a, and base station 105-a may not transmit an indication of a grant 220 to UE 115-a. If so, UE 115-a may go to sleep. In some examples, base station 105-a may identify pending data for UE 115-a and transmit an indication of a grant 220 for the data to UE 115-a during the pre-wakeup period, and may transmit or attempt to transmit grant 220. However, in some examples, UE 115-a may not successfully receive grant 220. In such examples, UE 115-a may reset a DRX inactivity timer, which may allow UE 115-a to return to sleep instead of remaining in an awake mode for the entirety of the on duration. In some examples, UE 115-a may initiate a long DRX inactivity timer, or may initiate a short DRX inactivity timer. Additionally or alternatively, base station 105-a may determine that the indicated grant was not received by UE 115-a. Base station 105-a may then reset its DRX inactivity timer after receiving the grant 220. Base station 105-a may initiate or revert to a long DRX inactivity timer, or may initiate a short DRX inactivity timer.

In other examples, base station 105-a may indicate a grant 220 and an on duration to UE 115-a, but UE 115-a may not reset a DRX short cycle timer if UE 115-a does not receive the grant 220. Base station 105-a may identify pending data for UE 115-a and transmit an indication of a grant 220 for the data to UE 115-a during a pre-wakeup period. UE 115-a may wake up for the on duration and prepare to receive the grant 220. If UE 115-a receives the grant 220, UE 115-a may reset a DRX inactivity timer, which may allow UE 115-a to return to sleep after receiving the grant 220 instead of being active for the rest of the on duration. If UE 115-a receives the grant during the on duration, UE 115-a may reset the DRX short cycle timer to remain in a short DRX cycle. However, in some examples, base station 105-a may transmit the indication of the grant 215, but base station 105-*a* may not transmit the grant 220 during the on duration. If UE 115-*a* does not receive the grant 220 during the on duration, UE 115-*a* may not reset the DRX short cycle timer, and UE 115-*a* may be able to enter a long DRX cycle.

In some examples, base station 105-*a* may include an on duration in an indication for a grant 220 to UE 115-*a* if base station 105-*a* can schedule UE 115-*a* in a current DRX cycle. If base station 105-*a* has pending data for UE 115-*a* and can schedule UE 115-*a* during the current DRX cycle, base station 105-*a* may notify UE 115-*a* to wake up for the on duration to receive the grant 220. If UE 115-*a* receives the grant 220, UE 115-*a* may reset the DRX inactivity timer, which may allow UE 115-*a* to return to sleep after receiving the grant 220 instead of waiting for the rest of the on duration. If base station 105-*a* does not have pending data or cannot schedule UE 115-*a* for the current DRX cycle, base station 105-*a* may not transmit an indication of the grant 215, and UE 115-*a* may go to sleep. Then, base station 105-*a* may not schedule a grant 220 until the next DRX cycle.

UE 115-*a* may dynamically switch between DRX modes of operation or configurations. For example, UE 115-*a* may switch between a pre-wakeup configuration and a periodic on duration configuration. For example, if UE 115-*a* is served during a last DRX cycle, UE 115-*a* may operate with the periodic on duration configuration in a following DRX cycle. Otherwise, UE 115-*a* may operate using the pre-wakeup configuration. If UE 115-*a* is served with a specific traffic pattern with a known burst periodicity, UE 115-*a* may switch from the pre-wakeup configuration to the periodic on duration configuration. In some examples, base station 105-*a* may transmit a configuration indication to UE 115-*a*, which may indicate to UE 115-*a* which configuration to use (e.g., which DRX mode to operate in). The configuration indication may be based on network performance metrics.

Figure 3:
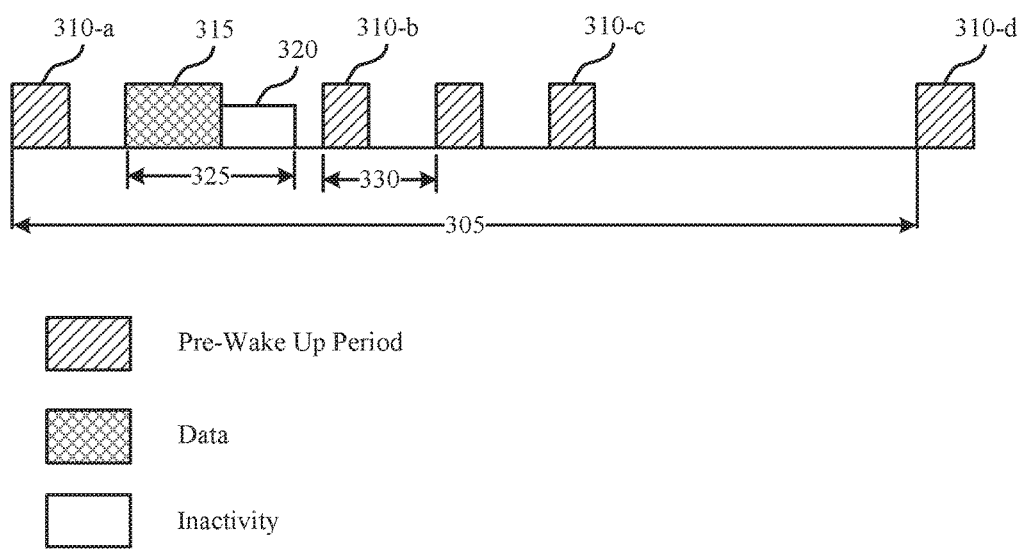
FIGS. 3 through 6 illustrate examples of pre-wakeup grant indication communication flows, in accordance with one or more aspects of the present disclosure.

FIG. 3 shows a pre-wakeup grant indication communication flow 300 that supports wakeup techniques for improved connected mode discontinuous reception in accordance with various aspects of the present disclosure. By way of example, a base station 105 identify pending data for a UE 115, and the base station 105 may transmit an indication of a grant for buffered data to the UE 115. The indication of the grant may include scheduling information for the grant. The UE 115 and base station 105 may be described herein with reference to FIGS. 1 and 2.

The base station 105 may identify pending data for the UE 115. The UE 115 may be in a DRX cycle such as a long DRX cycle 305 or a short DRX cycle 330. The base station 105 may transmit an indication of a grant and scheduling information for the grant to the UE 115 during a pre-wakeup period 310. A pre-wakeup period 310 may be a periodic time period during which the UE 115 checks for downlink information (e.g., an indication of a downlink grant) from the base station 105. If the UE 115 does not receive an indication during the pre-wakeup period, the UE 115 may go back to sleep. In some examples, the UE 115 may switch from a long DRX cycle 305 to a short DRX cycle 330 based on identifying an indication of a grant in pre-wakeup period 310-*a*.

The base station 105 may transmit an indication of a grant to the UE 115 during pre-wakeup period 310-*a*. The base station 105 may include scheduling information for the grant in the indication. The UE 115 may wake up based on the scheduling information to receive the grant included in data 315. The UE 115 may wake up for an on duration 325, where the on duration 325 includes the duration of the data 315 and an inactivity period 320. The UE 115 may reset a DRX inactivity timer after receiving the grant, returning the UE 115 to sleep. For example, the UE 115 may remain on for the inactivity period 320, but the UE 115 may not be active to receive additional downlink information. Or, the UE 115 may sleep as soon as the UE 115 finishes receiving the grant. The UE 115 may continue to check for downlink information in a next short DRX cycle 330 during a pre-wakeup period 310, such as pre-wakeup period 310-*b*.

Alternatively, the UE 115 may wake up for an on duration 325, where the on duration 325 includes the duration of the data 315 and an inactivity period 320. However, UE 115 may not successfully receive the grant, and upon identifying that the grant has not been received, UE 115 may reset a DRX inactivity timer, returning the UE 115 to sleep.

At pre-wakeup period 310-*c*, the UE 115 may determine that the UE 115 has not received an indication of a downlink grant for a number of short DRX cycles 330. Therefore, UE 115 may switch to a long DRX cycle 305, and the UE 115 may sleep until pre-wakeup period 310-*d*. Pre-wakeup period 310-*d* may be the start of a new long DRX cycle 305.

In some examples, the base station 105 may not have pending data for the UE 115 at the beginning of the long DRX cycle 305, so the UE 115 may go to sleep. If the base station 105 does not have pending data for the UE 115 at the beginning of the long DRX cycle 305, the base station 105 may not schedule a grant for the UE 115 until the next DRX cycle (e.g., a DRX cycle including pre-wakeup period 310-*d*). Indicating scheduling information to the UE 115 with the grant indication may reduce UE power usage, as the UE 115 may only wake up to receive the indication.

Figure 4:
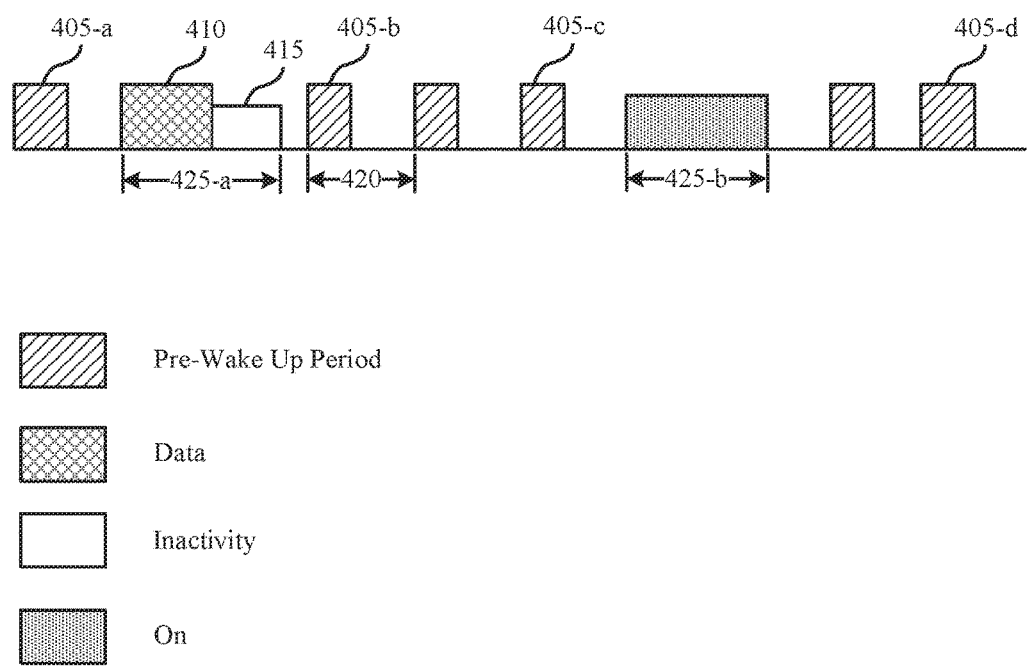

FIG. 4 shows a pre-wakeup grant indication communication flow 400 that supports wakeup techniques for improved connected mode discontinuous reception, in accordance with various aspects of the present disclosure. By way of example, a base station 105 may transmit an indication of a grant for buffered data to a UE 115. The indication of the grant may include an on duration, during which the UE 115 may receive the grant. If the UE 115 detects the indication, the UE 115 may reset a DRX short cycle timer, and begin another short DRX cycle 420. The UE 115 and base station 105 may be described herein with reference to FIGS. 1 and 2.

The base station 105 may identify pending data for the UE 115. The UE 115 may be in a short DRX cycle 420 or a long DRX cycle. The base station 105 may transmit an indication of a grant and an on duration 425 for the grant to the UE 115 during a pre-wakeup period 405. A pre-wakeup period 405 may be a periodic time period during which the UE 115 checks for downlink information (e.g., an indication of a downlink grant) from the base station 105. If the UE 115 does not receive an indication during the pre-wakeup period, the UE 115 may go back to sleep. In some examples, the UE 115 may switch from a long DRX cycle to a short DRX cycle 420 based on identifying an indication of a grant in pre-wakeup period 405-*a*.

The base station 105 may transmit an indication of a grant and an indication of on duration 425-*a* to the UE 115 during pre-wakeup period 405-*a*. On duration 425-*a* may be a time period during which the base station 105 may transmit the grant. For example, the UE 115 may receive the downlink grant in data 410, but on duration 425-*a* may include the duration of the data 410 and an inactivity period 415. The UE 115 may reset a DRX inactivity timer after receiving the grant, returning the UE 115 to sleep. For example, the UE 115 may remain on for the inactivity period 415, but the UE 115 may not be active to receive additional downlink information. Or, the UE 115 may sleep as soon as the UE 115 finishes receiving the grant. The UE 115 may continue to check for downlink information in a next short DRX cycle 420 during a pre-wakeup period 405, such as pre-wakeup period 405-b.

The base station 105 may identify additional pending data and transmit an indication of another grant during pre-wakeup period 405-c. The base station 105 may also indicate on duration 425-b to the UE 115 in pre-wakeup period 405-c. The UE 115 may be on for on duration 425-b, but the base station 105 may not transmit the grant (e.g., due to loading of the base station 105). The UE 115 may not receive the grant, but the UE 115 may still reset a DRX short cycle timer, such that the UE 115 may not enter a long DRX cycle while the base station 105 has pending data. Therefore, pre-wakeup period 405-d may be included in a short DRX cycle 420. In some examples, the UE 115 may continue to operate in a short DRX cycle 420 until the UE 115 receives the pending downlink data and further receives no indication of a downlink grant for a number of pre-wakeup periods 405.

In some examples, the base station 105 may not have pending data for the UE 115 at the beginning of the first DRX cycle, so the UE 115 may go to sleep. If the base station 105 does not have pending data for the UE 115 at the beginning of the first DRX cycle, the base station 105 may not schedule a grant for the UE 115 until the next DRX cycle.

Figure 5:
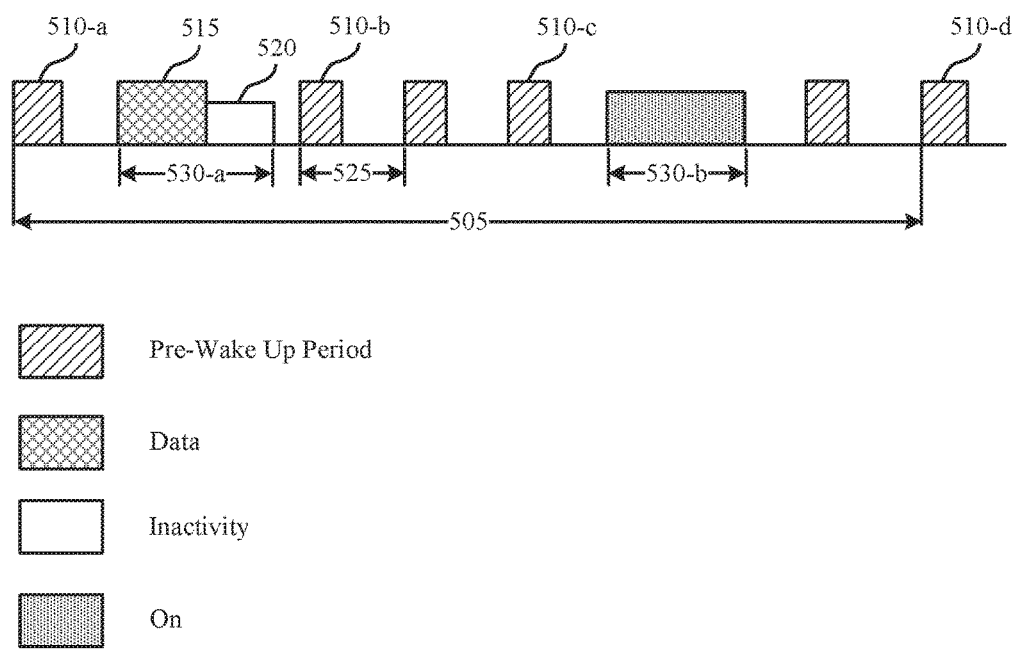

FIG. 5 shows a pre-wakeup grant indication communication flow 500 that supports wakeup techniques for improved connected mode discontinuous reception, in accordance with various aspects of the present disclosure. By way of example, a base station 105 may transmit an indication of a grant for buffered data to a UE 115. The indication of the grant may include an on duration, during which the UE 115 may receive the grant. If the UE 115 does not receive the grant, the UE 115 may not reset a DRX short cycle timer, and allowing the UE 115 to enter a long DRX cycle 505. The UE 115 and base station 105 may be described herein with reference to FIGS. 1 and 2.

The base station 105 may identify pending data for the UE 115. The UE 115 may be in a short DRX cycle 525 or a long DRX cycle 505. The base station 105 may transmit an indication of a grant and an on duration for the grant to the UE 115 during a pre-wakeup period 510. A pre-wakeup period 510 may be a periodic time period during which the UE 115 checks for downlink information (e.g., an indication of a downlink grant) from the base station 105. If the UE 115 does not receive an indication during the pre-wakeup period, the UE 115 may go back to sleep. In some examples, the UE 115 may switch from a long DRX cycle 505 to a short DRX cycle 525 based on identifying an indication of a grant in pre-wakeup period 510-a.

The base station 105 may transmit an indication of a grant and an indication of on duration 530-a to the UE 115 during pre-wakeup period 510-a. On duration 530-a may be a time period during which the base station 105 may transmit the grant. For example, the UE 115 may receive the downlink grant in data 515, but on duration 530-a may include the duration of the data 515 and an inactivity period 520. The UE 115 may reset a DRX inactivity timer after receiving the grant, returning the UE 115 to sleep. For example, the UE 115 may remain on for the inactivity period 520, but the UE 115 may not be active to receive additional downlink information. Or, the UE 115 may sleep as soon as the UE 115 finishes receiving the grant. The UE 115 may continue to check for downlink information in a next short DRX cycle 525 during a pre-wakeup period 510, such as pre-wakeup period 510-b.

In some examples, UE 115 may receive the indication of a grant and an on duration for the grant during pre-wakeup period 510, but may not receive the grant in data 515. For example, base station 105 may not transmit data 515 (e.g., due to loading of the base station 105), or UE 115 may not successfully decode a portion or all of data 515. In such cases, UE 115 may identify that the grant has not been received, and may reset a DRX inactivity timer, returning the UE 115 to sleep. For example, the UE 115 may remain on for the inactivity period 520, but the UE 115 may not be active to receive additional downlink information. Or, the UE 115 may sleep as soon as the UE 115 identifies that the grant has not been received. Resetting the DRX inactivity timer may including initiating a short DRX cycle, or a long DRX cycle.

Base station 105 may also identify that the grant was not received by UE 115, and reset a DRX inactivity timer at base station 105. The DRX inactivity timer at the base station 105 may be for a short DRX cycle, or a long DRX cycle, and may be consistent with the DRX inactivity timer of UE 115.

Additionally or alternatively, the base station 105 may identify additional pending data and transmit an indication of another grant during pre-wakeup period 510-c. The base station 105 may also indicate on duration 530-b to the UE 115 in pre-wakeup period 510-c. The UE 115 may be on for on duration 530-b, but the base station 105 may not transmit the grant (e.g., due to loading of the base station 105). The UE 115 may not receive the grant, so the UE 115 may not reset a DRX short cycle timer, such that the UE 115 may enter a long DRX cycle 505 although the base station 105 may still have pending data. Therefore, pre-wakeup period 510-d may be included in a long DRX cycle 505. In some examples, the UE 115 may continue to operate in a short DRX cycle 525, although until the UE 115 may switch to a long DRX cycle 505 if the UE 115 reaches a number of short DRX cycles 525 without receiving a downlink grant.

In some examples, the base station 105 may not have pending data for the UE 115 at the beginning of the long DRX cycle 505, so the UE 115 may go to sleep. If the base station 105 does not have pending data for the UE 115 at the beginning of the long DRX cycle 505, the base station 105 may not schedule a grant for the UE 115 until the next DRX cycle (e.g., the a long DRX cycle 505 including pre-wakeup period 510-d).

Figure 6:
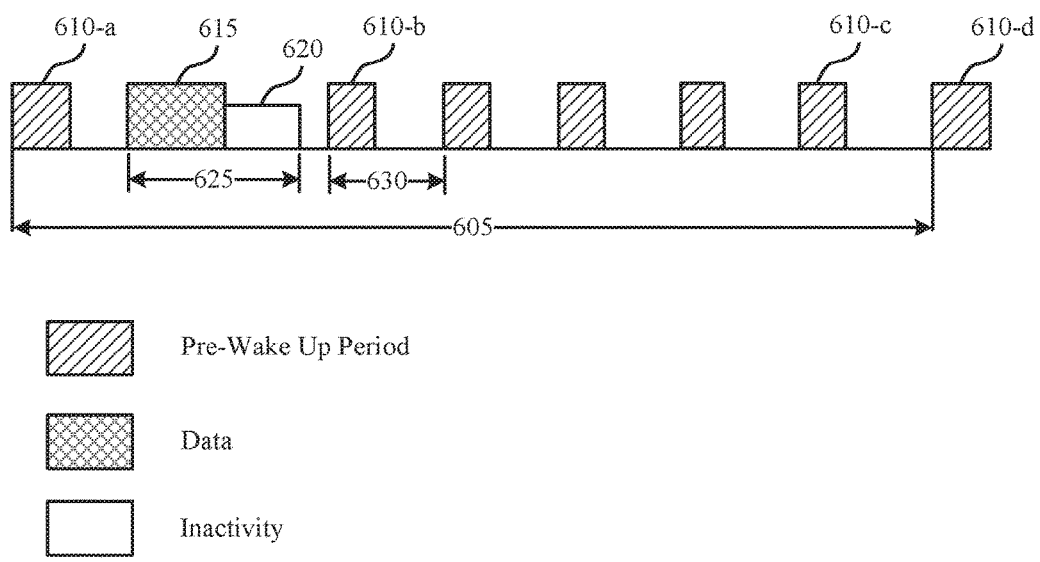

FIG. 6 shows a pre-wakeup grant indication communication flow 600 that supports wakeup techniques for improved connected mode discontinuous reception, in accordance with various aspects of the present disclosure. By way of example, a base station 105 may identify pending data for a UE 115. The base station 105 may transmit an indication of a grant for buffered data to the UE 115 during a pre-wakeup period of a DRX cycle. The base station 105 may transmit the indication if the base station 105 can schedule the UE 115 for the grant in the same DRX cycle. The UE 115 and base station 105 may be described herein with reference to FIGS. 1 and 2.

The base station 105 may identify pending data for the UE 115. The UE 115 may be in a DRX cycle such as a long DRX cycle 605 or a short DRX cycle 630. The base station 105 may transmit an indication of a grant for the grant to the UE 115 during a pre-wakeup period 610, but the base station 105 may only transmit the indication of the grant if the base station 105 can schedule the UE 115 in the same DRX cycle. A pre-wakeup period 610 may be a periodic time period during which the UE 115 checks for downlink information (e.g., an indication of a downlink grant) from the base station 105. If the UE 115 does not receive an indication during the pre-wakeup period, the UE 115 may go back to sleep. In some examples, the UE 115 may switch from a long DRX cycle 605 to a short DRX cycle 630 based on identifying an indication of a grant in pre-wakeup period 610-*a*.

The base station 105 may identify pending data for the UE 115 and determine whether the base station 105 can schedule the UE 115 for the grant. If the base station 105 can schedule the grant, the base station 105 may transmit an indication of the grant to the UE 115 during pre-wakeup period 610-*a*. The base station 105 may include an on duration 625 in the indication, during which the UE 115 may receive the grant. The UE 115 may wake up for the on duration 625 to receive the grant included in data 615. The UE 115 may reset a DRX inactivity timer after receiving the grant, returning the UE 115 to sleep. For example, the UE 115 may remain on for an inactivity period 620, but the UE 115 may not be active to receive additional downlink information. Or, the UE 115 may sleep as soon as the UE 115 finishes receiving the grant. The UE 115 may continue to check for downlink information in a next short DRX cycle 630 during a pre-wakeup period 610, such as pre-wakeup period 610-*b*.

In some examples, the base station 105 may identify pending data for the UE 115 and may transmit an indication of the grant to the UE 115 during pre-wakeup period 610-*a*. The base station 105 may include an on duration 625 in the indication, during which the UE 115 may receive the grant. The UE 115 may wake up for the on duration 625 to receive the grant included in data 615. However, in some cases, the UE 115 may not receive the indicated grant. Base station 105 may identify that the grant of resources indicated by the transmitted indication was not received by the UE 115. The UE 115 may reset a DRX inactivity timer after receiving the grant, returning the UE 115 to sleep. For example, the UE 115 may remain on for an inactivity period 620, but the UE 115 may not be active to receive additional downlink information. The UE 115 may continue to check for downlink information in a next short DRX cycle 630 during a pre-wakeup period 610, such as pre-wakeup period 610-*b*.

At pre-wakeup period 610-*c*, the UE 115 may determine that the UE 115 has not received an indication of a downlink grant for a number of short DRX cycles 630. Therefore, UE 115 may switch to a long DRX cycle 605, and the UE 115 may sleep until pre-wakeup period 610-*d*. Pre-wakeup period 610-*d* may be the start of a new long DRX cycle 605.

In some examples, the base station 105 may not have pending data for the UE 115 at the beginning of the long DRX cycle 605, so the UE 115 may go to sleep. If the base station 105 does not have pending data for the UE 115 at the beginning of the long DRX cycle 605, the base station 105 may not schedule a grant for the UE 115 until the next DRX cycle (e.g., a DRX cycle including pre-wakeup period 610-*d*).

Figure 7:
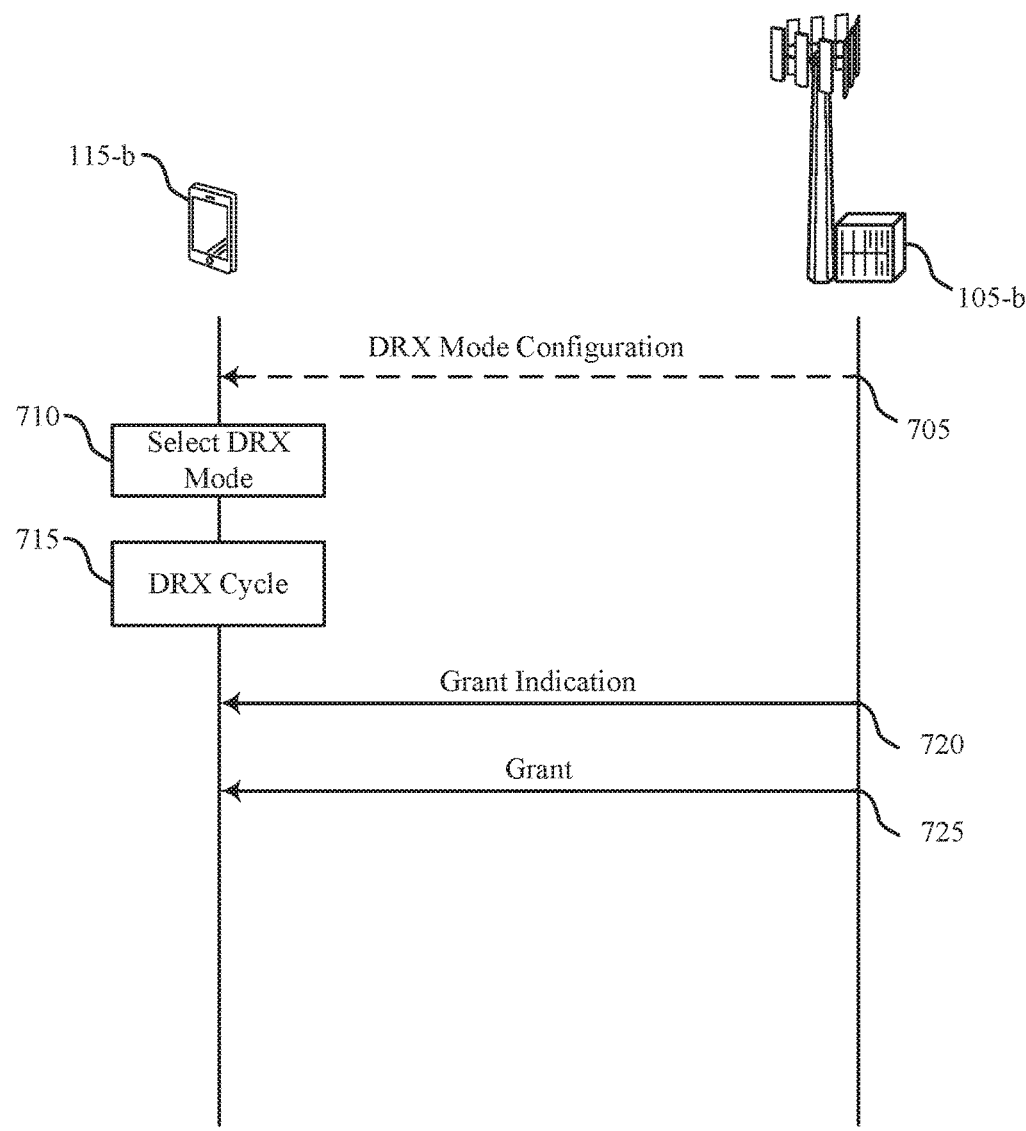
FIGS. 7, 8 and 9 show process flow diagrams that support wakeup techniques for improved connected mode discontinuous reception, in accordance with one or more aspects of the present disclosure.

FIG. 7 shows a process flow diagram 700 that support wakeup techniques for improved connected mode discontinuous reception, in accordance with various aspects of the present disclosure. By way of example, base station 105-*b* and UE 115-*b* may be configured for wireless communication, and UE 115-*b* may be in a DRX mode or entering a DRX mode. UE 115-*b* may operate using a first DRX mode where UE 115-*b* has a pre-wakeup period at the beginning of a DRX cycle. In the first DRX mode, UE 115-*b* may receive an indication of a grant such that UE 115-*b* may wake up at a later time to receive the grant. Or, UE 115-*b* may operate using a second DRX mode, where UE 115-*b* wakes up at the beginning of each DRX cycle. UE 115-*b* may be awake for a time of each DRX cycle, in case UE 115-*b* receives a grant.

At 705, base station 105-*b* may transmit a DRX mode configuration to UE 115-*b*. The DRX mode configuration may include the first DRX mode or the second DRX mode. In some examples, the DRX mode configuration may be based on network performance metrics.

At 710, UE 115-*b* may select a DRX mode for a following DRX cycle. UE 115-*b* may select the DRX mode based on the DRX mode configuration received from base station 105-*b*. In other examples, UE 115-*b* may not receive the DRX mode configuration from base station 105-*b*, for example because no such DRX mode configuration was transmitted. In some examples, UE 115-*b* may select a DRX mode based on whether the UE was served during a previous DRX cycle. For example, if UE 115-*b* was served during the last DRX cycle, UE 115-*b* may choose to use the second DRX mode. Otherwise, the UE may choose to use the first DRX mode. In some examples, UE 115-*b* may select a DRX mode based on traffic patterns, or a burst periodicity of the traffic patterns. For example, if UE 115-*b* is served by a Voice over LTE (VoLTE) configuration, UE 115-*b* may select the first DRX mode.

At 715, UE 115-*b* may begin a DRX cycle based on the DRX mode selected at 710. At 720, UE 115-*b* may receive an indication of a grant of resources, and at 725, UE 115-*b* may receive the indicated grant, each as further described above.

Figure 8:
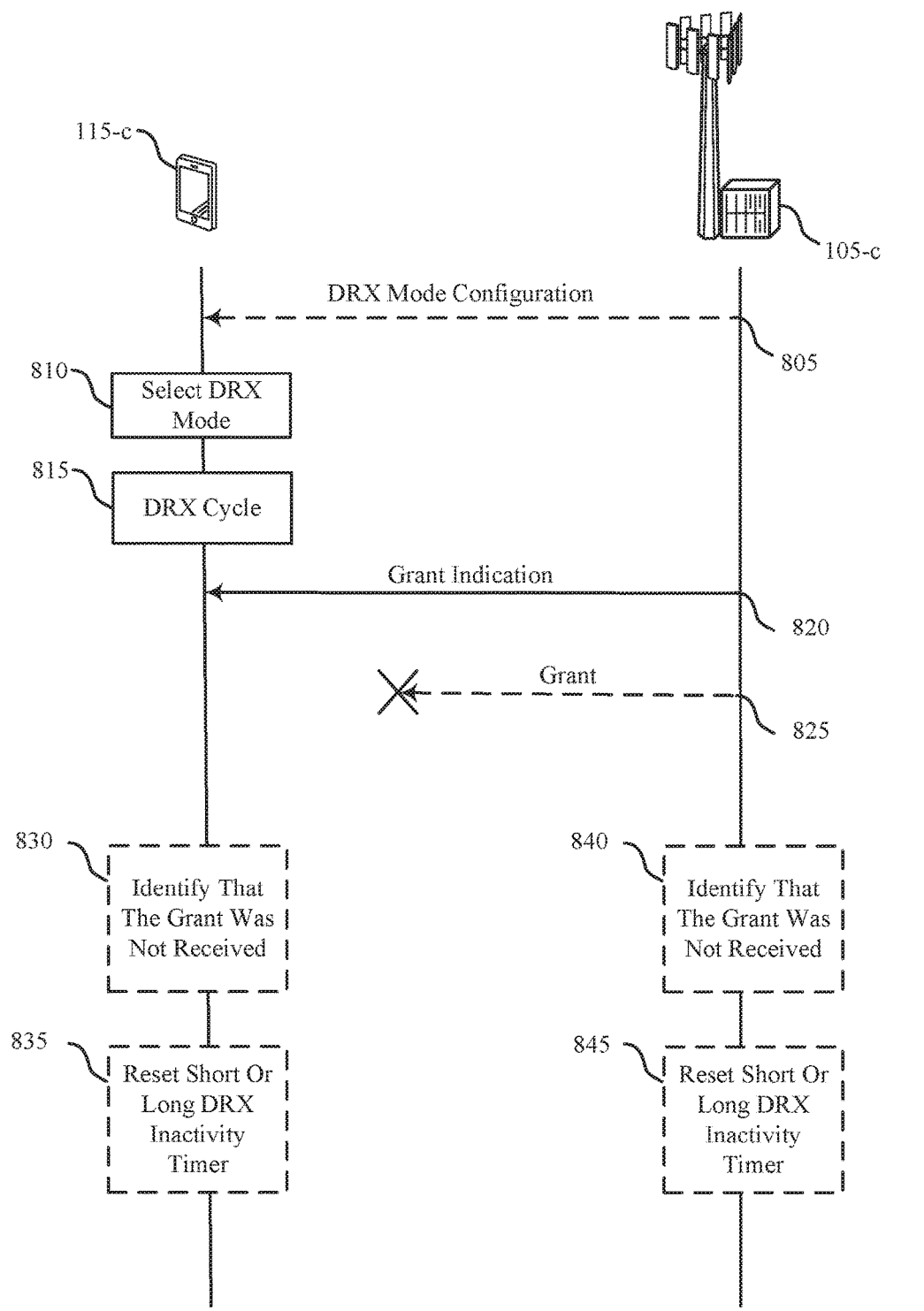

FIG. 8 shows a process flow diagram 900 that support wakeup techniques for improved connected mode discontinuous reception, in accordance with various aspects of the present disclosure. By way of example, base station 105-*c* and UE 115-*c* may be configured for wireless communication, and UE 115-*c* may be in a DRX mode or entering a DRX mode. UE 115-*c* may operate using a first DRX mode where UE 115-*c* has a pre-wakeup period at the beginning of a DRX cycle. In the first DRX mode, UE 115-*c* may receive an indication of a grant such that UE 115-*c* may wake up at a later time to receive the grant. Or, UE 115-*c* may operate using a second DRX mode, where UE 115-*c* wakes up at the beginning of each DRX cycle. UE 115-*c* may be awake for a time of each DRX cycle, in case UE 115-*c* receives a grant.

At 805, base station 105-*c* may transmit a DRX mode configuration to UE 115-*c*. The DRX mode configuration may include the first DRX mode or the second DRX mode. In some examples, the DRX mode configuration may be based on network performance metrics.

At 810, UE 115-*c* may select a DRX mode for a following DRX cycle. UE 115-*c* may select the DRX mode based on the DRX mode configuration received from base station 105-*c*. In other examples, UE 115-*c* may not receive the DRX mode configuration from base station 105-*c*, for example because no such DRX mode configuration was transmitted. In some examples, UE 115-*c* may select a DRX mode based on whether the UE was served during a previous DRX cycle. For example, if UE 115-*c* was served during the last DRX cycle, UE 115-*c* may choose to use the second DRX mode. Otherwise, the UE may choose to use the first DRX mode. In some examples, UE 115-*c* may select a DRX mode based on traffic patterns, or a burst periodicity of the traffic patterns. For example, if UE 115-*c* is served by a Voice over LTE (VoLTE) configuration, UE 115-*c* may select the first DRX mode.

At 815, UE 115-*b* may begin a DRX cycle based on the DRX mode selected at 810.

At 820, base station 105-*c* may transmit a grant indication to UE 115-*c*. The grant indication may indicate that UE 115-*c* is to wake up for a duration of time. UE 115-*c* may wake up, in response to the received grant indication, in order to attempt to receive the indicated grant.

At 830, UE 115-*c* may identify that the grant of resources was not received by the UE 115-*c*. UE 115-*c* may identify that the grant of resources was not received by monitoring for the grant of resources based at least in part on receiving the indication that the grant of resources will be transmitted. In some examples, UE 115-*c* may not receive the grant, for example because base station 105-*a* has not transmitted the grant. In some examples, base station 105-*c* may transmit the indicated grant at 825, but UE 115-*c* may not successfully receive the grant, for example because UE 115-*c* does not receive the signal containing the grant, or does not successfully decode the signal. In some examples, the grant indication transmitted at 820 and the grant transmitted at 825 may be transmitted within the same discontinuous reception cycle.

At 835, UE 115-*c* may reset a discontinuous reception cycle timer based at least in part on identifying that the grant was not received at 830. In some examples, UE 115-*c* may initiate a long discontinuous reception cycle based at least in part on the identification. Alternatively, UE 115-*c* may initiate a short discontinuous reception cycle based at least in part on the identification.

Additionally or alternatively, in some examples, at 840, base station 105-*c* may identify that the grant of resources indicated by the transmitted indication was not received by the UE. In some examples, base station 105-*c* may identify that the grant of resources indicated by the transmitted indication was not transmitted by base station 105-*c* at 825. in other examples, base station 105-*c* may receive an indication from UE 115-*c* that the grant of resources indicated at 820 was not received by UE 115-*c*.

At 845, base station 105-*c* may reset a discontinuous reception cycle timer based at least in part on identifying that the grant of resources indicated by the transmitted indication was not received by UE 115-*c* at 840. In some examples, base station 105-*c* may initiate a long discontinuous reception cycle based at least in part on identifying that the grant of resources indicated by the transmitted indication was not received by UE 115-*c*. Alternatively, base station 105-*c* may initiate a short discontinuous reception cycle based at least in part on identifying that the grant of resources indicated by the transmitted indication was not received by UE 115-*c*.

Figure 9:
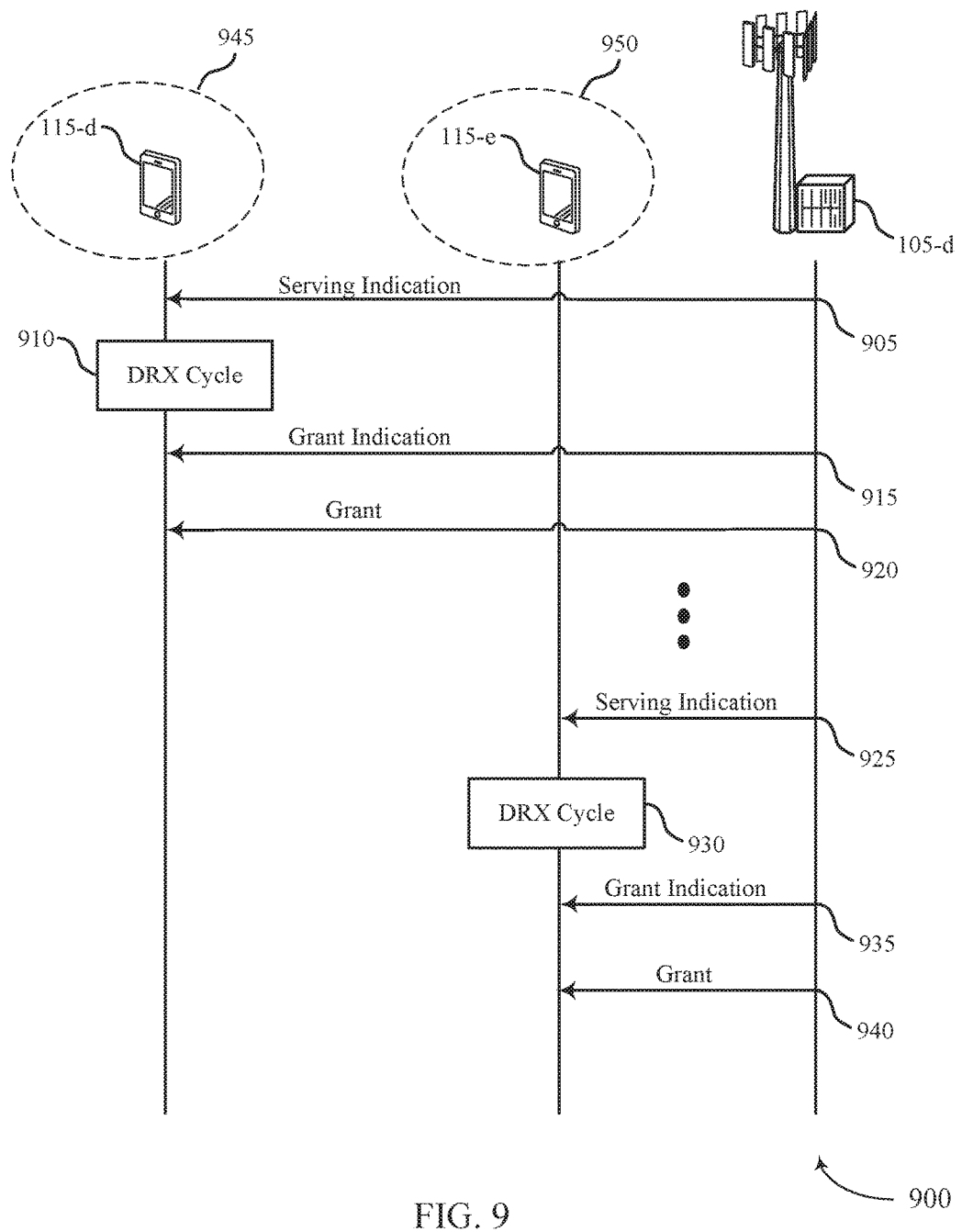

FIG. 9 shows a process flow diagram 900 that supports wakeup techniques for improved connected mode discontinuous reception, in accordance with various aspects of the present disclosure. By way of example, base station 105-*c*, UE 115-*d*, and UE 115-*e* may be configured for wireless communication. UE 115-*d* and UE 115-*e* may be in a DRX mode or entering a DRX mode. UE 115-*d* and UE 115-*e* may each be in separate groups of UEs 115. For example, UE 115-*d* may represent a first group of UEs 115, and UE 115-*e* may represent a second group of UEs 115. In some examples, base station 105-*d* may serve one group of UEs 115 at a time, such as the group of UEs 115 with a large amount of buffered data.

At 905, base station 105-*d* may transmit a service indication to UE 115-*d*. The service indication may indicate to a first group of UEs 115 that base station 105-*d* may start to serve the first group of UEs 115. UE 115-*d* may be included in the first group of UEs 115.

At 910, UE 115-*d* may begin a DRX cycle. UE 115-*d* may use a DRX mode with a pre-wakeup period at the start of the DRX cycle. UE 115-*d* may check for an indication of a grant during the pre-wakeup period. In some examples, other UEs 115 in the first group of UEs 115 may also begin a DRX cycle.

At 915, base station 105-*d* may transmit an indication of a grant to UE 115-*d*. The indication of the grant may include scheduling information or a period during which UE 115-*d* may wake up to prepare to receive the grant. In some examples, base station 105-*d* may also transmit an indication of a grant to other UEs 115 in the first group of UEs 115.

At 920, base station 105-*d* may transmit a service indication to UE 115-*e*. After base station 105-*d* serves UE 115-*d* and UEs 115 grouped with UE 115-*d* as group 945, base station 105-*d* may begin to serve a second group 950 of UEs 115. UE 115-*e* may be included in the second group 950 of UEs 115.

At 925, UE 115-*e* and other UEs 115 the second group of UEs 115 may begin a DRX cycle. UE 115-*e* and the second group of UEs 115 may use a DRX mode with a pre-wakeup period at the start of the DRX cycle.

At 930, base station 105-*d* may transmit an indication of a grant to UE 115-*e*. The indication of the grant may include scheduling information or a period during which UE 115-*e* may wake up to prepare to receive the grant. In some examples, base station 105-*d* may also transmit an indication of a grant to other UEs 115 in the second group of UEs 115. At 935, UE 115-*e* may receive an indication of a grant of resources, and at 940, UE 115-*e* may receive the indicated grant, each as further described above.

Figure 10:
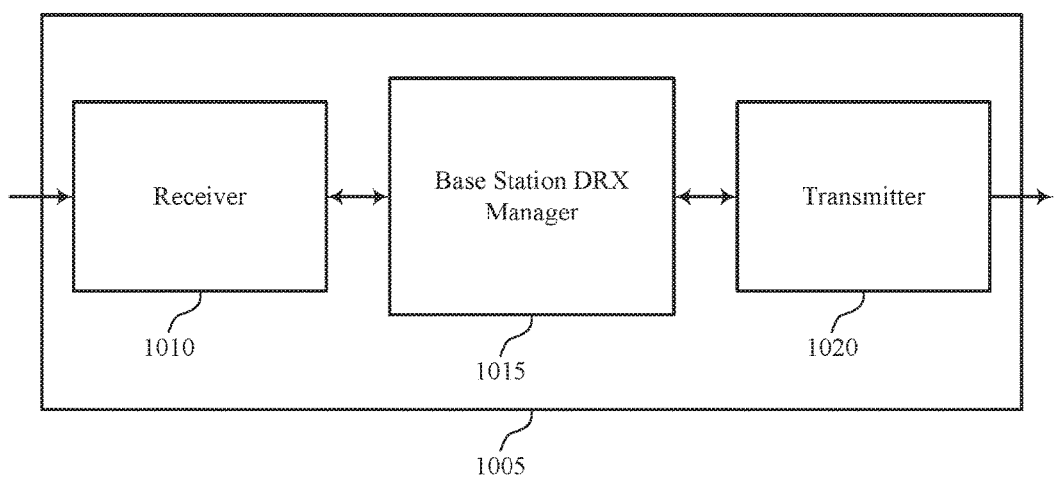
FIGS. 10 through 12 show block diagrams of a device that supports wakeup techniques for improved connected mode discontinuous reception, in accordance with one or more aspects of the present disclosure.

FIG. 10 shows a block diagram 1000 of a wireless device 1005 that supports wakeup techniques for improved connected mode discontinuous reception in accordance with various aspects of the present disclosure. Wireless device 1005 may be an example of aspects of a base station 105 as described with reference to FIG. 1. Wireless device 1005 may include receiver 1010, base station DRX manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to wakeup techniques for improved connected mode discontinuous reception, etc.). Information may be passed on to other components of the device. The receiver 1010 may be an example of aspects of the transceiver 1335 described with reference to FIG. 13.

Base station DRX manager 1015 may be an example of aspects of the base station DRX manager 1315 described with reference to FIG. 13.

Base station DRX manager 1015 may identify that a buffer contains data for transmission to a UE, transmit to the UE based on the identifying, an indication that a grant of resources will be subsequently transmitted to the UE, and transmit, to the UE while the UE is in a discontinuous reception state, the grant of resources following the transmission of the indication. In some examples, base station DRX manager 1015 may reset a discontinuous reception cycle timer based at least in part on identifying that the grant of resources indicated by the transmitted indication was not received by the UE.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
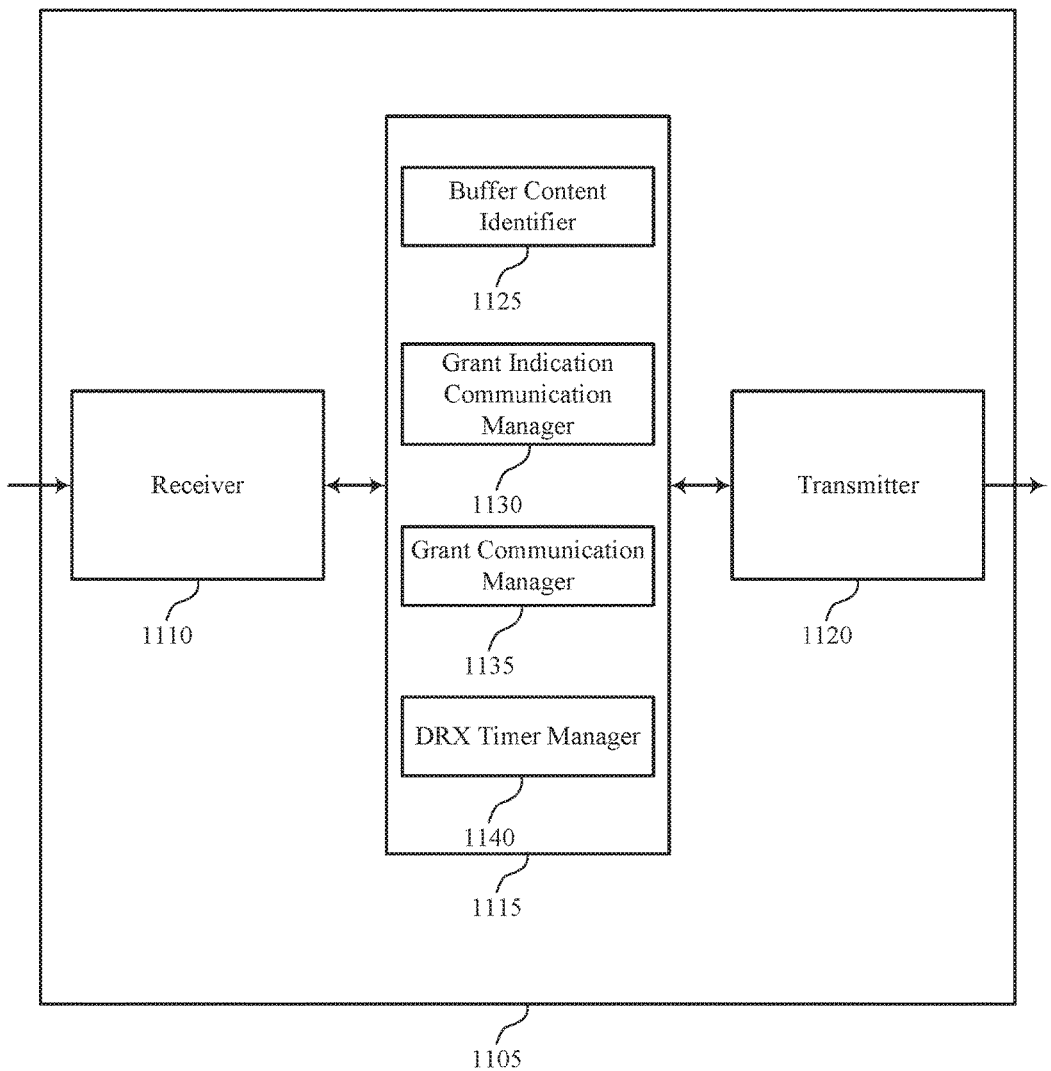

FIG. 11 shows a block diagram 1100 of a wireless device 1105 that supports wakeup techniques for improved connected mode discontinuous reception in accordance with various aspects of the present disclosure. Wireless device 1105 may be an example of aspects of a wireless device 1005 or a base station 105 as described with reference to FIGS. 1 and 10. Wireless device 1105 may include receiver 1110, base station DRX manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to wakeup techniques for improved connected mode discontinuous reception, etc.). Information may be passed on to other components of the device. The receiver 1110 may be an example of aspects of the transceiver 1335 described with reference to FIG. 13.

Base station DRX manager 1115 may be an example of aspects of the base station DRX manager 1315 described with reference to FIG. 13.

Base station DRX manager 1115 may also include buffer content identifier 1125, grant indication communication manager 1130, grant communication manager 1135, and DRX timer manager 1140.

Buffer content identifier 1125 may identify that a buffer contains data for transmission to a UE and identify the set of UEs is based on an amount of data for transmission associated with respective buffers associated with each of the set of UEs.

Grant indication communication manager 1130 may transmit, to the UE based on the identifying, an indication that a grant of resources will be subsequently transmitted to the UE. In some cases, the indication may indicate that the UE is to wake up for a duration of time. In some other cases, the indication may also indicate a time for the UE to wake up to listen for the grant of resources. Furthermore, in some cases the grant indication communication manager 1130 may transmit a group indication that one or more grants of resources will be transmitted for the identified set of UEs. In some cases, the indication that the grant of resources will be subsequently transmitted to the UE and the grant of resources are transmitted during the same discontinuous reception cycle. In some cases, the indication indicates that the UE is to wake up for a duration of time.

Grant communication manager 1135 may transmit, to the UE while the UE is in a discontinuous reception state, the grant of resources following the transmission of the indication and transmit the indication that the grant of resources will be transmitted to the UE in a beginning subframe of a discontinuous reception cycle.

DRX timer manager 1140 may reset a discontinuous reception cycle timer based at least in part on identifying that the grant of resources indicated by the transmitted indication was not received by the UE. Furthermore, in some cases, DRX timer manager 1140 may initiate a long discontinuous reception cycle or a short discontinuous reception cycle based at least in part on identifying that the grant of resources indicated by the transmitted indication was not received by the UE. DRX timer manager 1140 may also identify that the grant of resources indicated by the transmitted indication was not transmitted by the base station, or receive from the UE an indication that the grant of resources indicated by the transmitted indication was not received by the UE.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
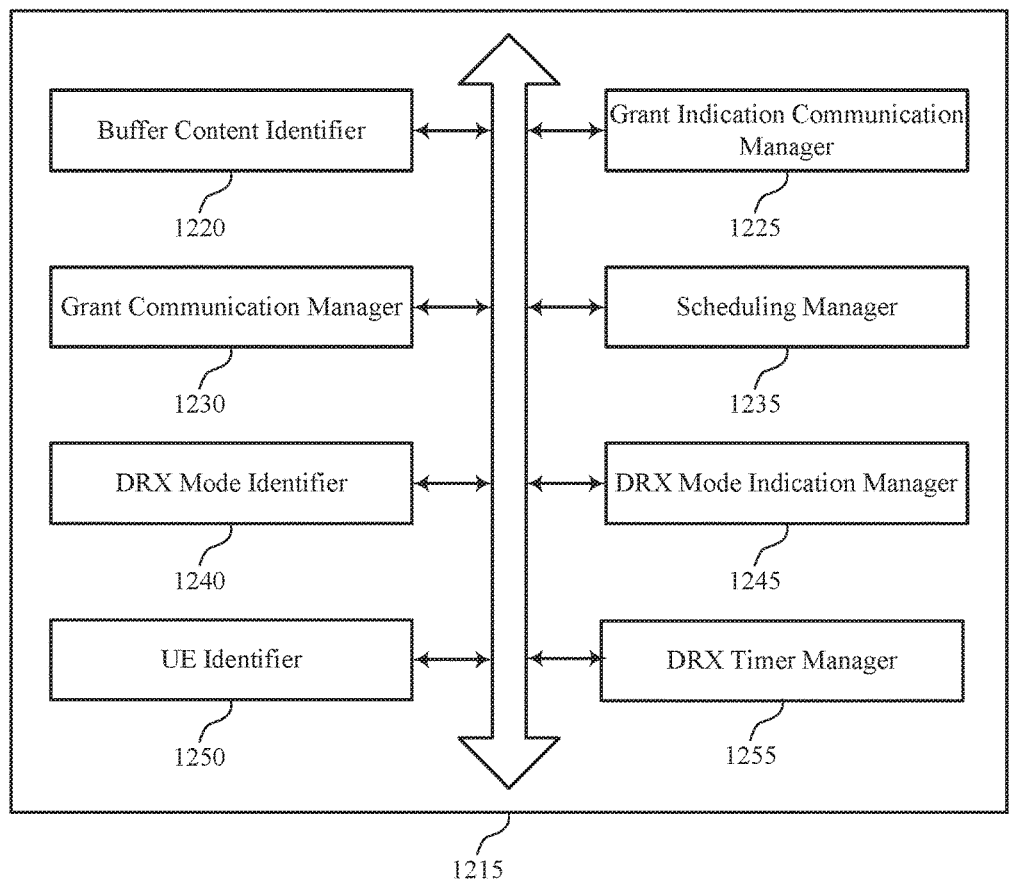

FIG. 12 shows a block diagram 1200 of a base station DRX manager 1215 that supports wakeup techniques for improved connected mode discontinuous reception in accordance with various aspects of the present disclosure. The base station DRX manager 1215 may be an example of aspects of a base station DRX manager 1015, a base station DRX manager 1115, or a base station DRX manager 1315 described with reference to FIGS. 10, 11, and 13. The base station DRX manager 1215 may include buffer content identifier 1220, grant indication communication manager 1225, grant communication manager 1230, scheduling manager 1235, DRX mode identifier 1240, DRX mode indication manager 1245, UE identifier 1250, and DRX timer manager 1255. Each of these modules may communicate, directly or indirectly, with one another (e.g., via one or more buses).

Buffer content identifier 1220 may identify that a buffer contains data for transmission to a UE and identify the set of UEs is based on an amount of data for transmission associated with respective buffers associated with each of the set of UEs.

Grant indication communication manager 1225 may transmit, to the UE and based on the identifying, an indication that a grant of resources will be subsequently transmitted to the UE, wherein the indication indicates that the UE is to wake up for a duration of time, or the indication indicates a time for the UE to wake up to listen for the grant of resources, or a combination thereof. In some other cases, Grant indication communication manager 1225 may transmit a group indication that one or more grants of resources will be transmitted for the identified set of UEs. In some cases, the indication that the grant of resources will be subsequently transmitted to the UE and the grant of resources are transmitted during the same discontinuous reception cycle. In some cases, the indication indicates that the UE is to wake up for a duration of time.

Grant communication manager 1230 may transmit, to the UE while the UE is in a discontinuous reception state, the grant of resources following the transmission of the indication and transmit the indication that the grant of resources will be transmitted to the UE in a beginning subframe of a discontinuous reception cycle.

Scheduling manager 1235 may determine to schedule the UE during a discontinuous reception cycle.

DRX mode identifier 1240 may determine a discontinuous reception mode for the UE to use to receive transmissions from the base station.

DRX mode indication manager 1245 may transmit, to the UE, a mode indicator indicating the determined discontinuous reception mode. UE identifier 1250 may identify a set of UEs from among a set of UEs.

DRX timer manager 1255 may reset a discontinuous reception cycle timer based at least in part on identifying that the grant of resources indicated by the transmitted indication was not received by the UE. Furthermore, in some cases, DRX timer manager 1255 may initiate a long discontinuous reception cycle or a short discontinuous reception cycle based at least in part on identifying that the grant of resources indicated by the transmitted indication was not received by the UE. DRX timer manager 1255 may also identify that the grant of resources indicated by the transmitted indication was not transmitted by the base station, or receive from the UE an indication that the grant of resources indicated by the transmitted indication was not received by the UE.

Figure 13:
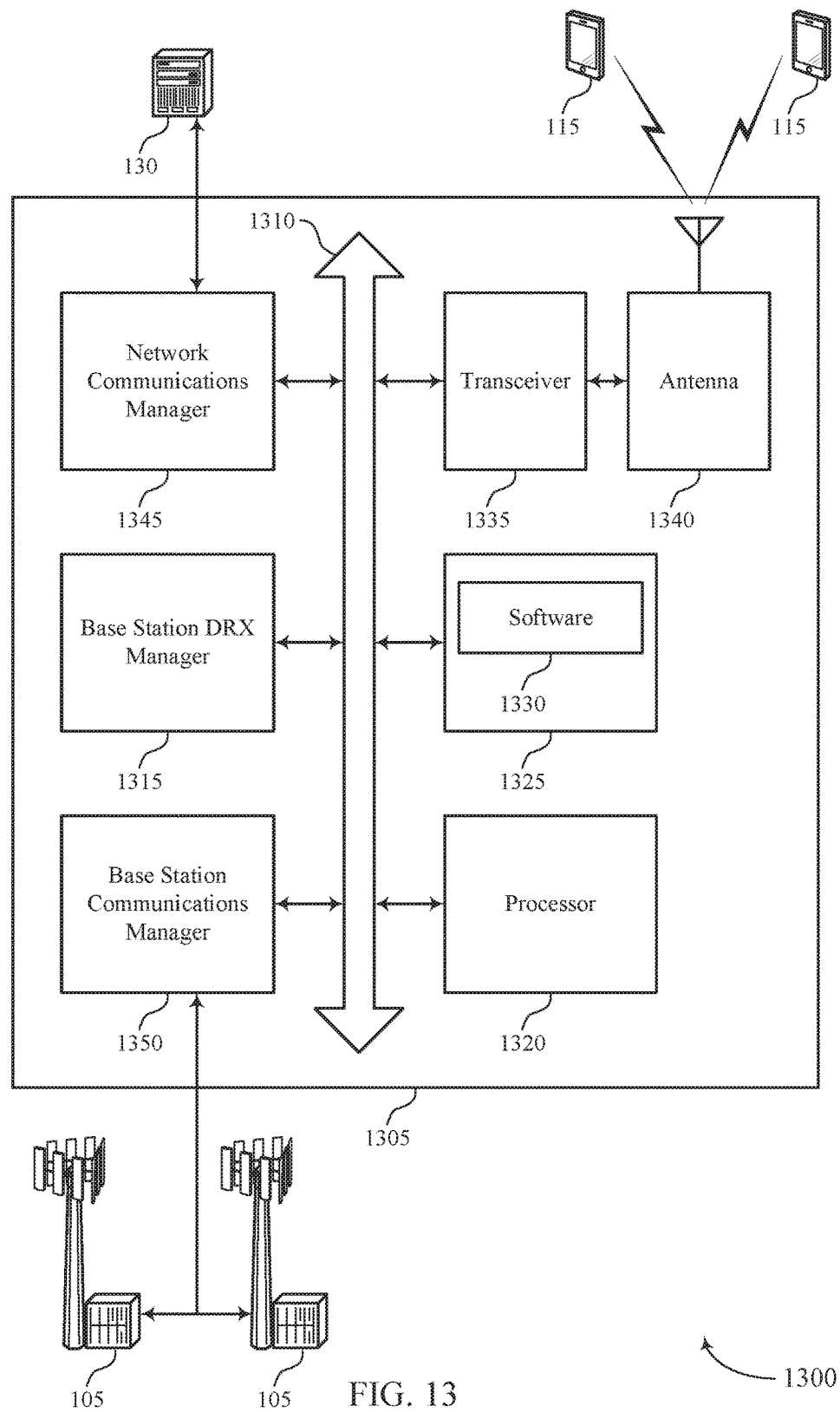
FIG. 13 illustrates a block diagram of a system including a base station that supports wakeup techniques for improved connected mode discontinuous reception, in accordance with one or more aspects of the present disclosure.

FIG. 13 shows a diagram of a system 1300 including a device 1305 that supports wakeup techniques for improved connected mode discontinuous reception in accordance with various aspects of the present disclosure. Device 1305 may be an example of or include the components of wireless device 1005, wireless device 1105, or a base station 105 as described above, e.g., with reference to FIGS. 1, 10 and 11. Device 1305 may include components for bi-directional voice and data communications including components for transmitting and receiving communications, including base station DRX manager 1315, processor 1320, memory 1325, software 1330, transceiver 1335, antenna 1340, network communications manager 1345, and base station communications manager 1350. These components may be in electronic communication via one or more busses (e.g., bus 1310). Device 1305 may communicate wirelessly with one or more UEs 115.

Processor 1320 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting wakeup techniques for improved connected mode discontinuous reception).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware and/or software operation such as the interaction with peripheral components or devices.

Software 1330 may include code to implement aspects of the present disclosure, including code to support wakeup techniques for improved connected mode discontinuous reception. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Base station communications manager 1350 may manage communications with other base station 105, and may include a controller or scheduler for controlling communications with UEs 115 in cooperation with other base stations 105. For example, the base station communications manager 1350 may coordinate scheduling for transmissions to UEs 115 for various interference mitigation techniques such as beamforming or joint transmission. In some examples, base station communications manager 1350 may provide an X2 interface within a LTE/LTE-A wireless communication network technology to provide communication between base stations 105.

Figure 14:
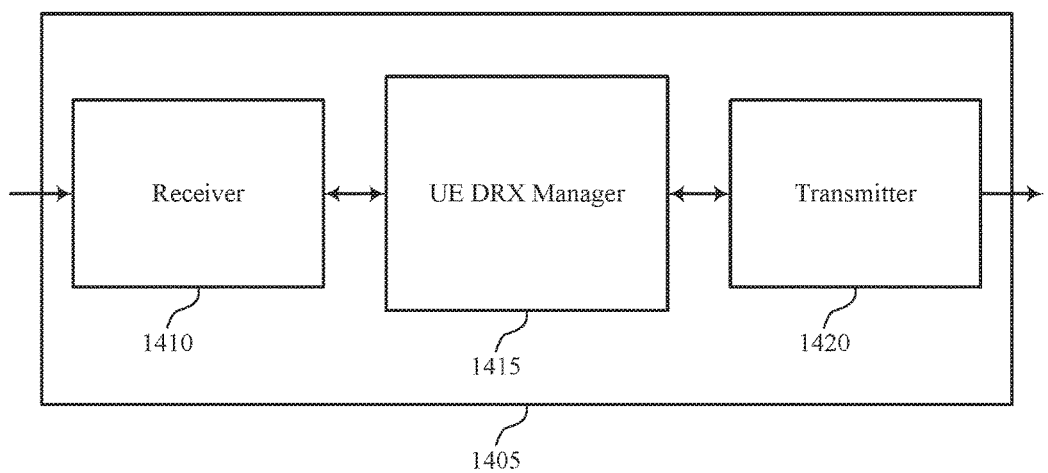
FIGS. 14 through 16 show block diagrams of a device that supports wakeup techniques for improved connected mode discontinuous reception, in accordance with one or more aspects of the present disclosure.

FIG. 14 shows a block diagram 1400 of a wireless device 1405 that supports wakeup techniques for improved connected mode discontinuous reception in accordance with various aspects of the present disclosure. Wireless device 1405 may be an example of aspects of a UE 115 as described with reference to FIG. 1. Wireless device 1405 may include receiver 1410, UE DRX manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to wakeup techniques for improved connected mode discontinuous reception, etc.). Information may be passed on to other components of the device. The receiver 1410 may be an example of aspects of the transceiver 1735 described with reference to FIG. 17.

UE DRX manager 1415 may be an example of aspects of the UE DRX manager 1715 described with reference to FIG. 17.

UE DRX manager 1415 may receive, from a base station while the UE is in a discontinuous reception state, an indication that a grant of resources will be transmitted by the base station to the UE and monitor for the grant of resources based on receiving the indication that the grant of resources will be transmitted. In some examples, UE DRX manager 1415 may also identify that the grant of resources indicated by the received indication was not received by the UE, and reset a discontinuous reception cycle timer based at least in part on the identification.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1735 described with reference to FIG. 17. The transmitter 1420 may include a single antenna, or it may include a set of antennas.

Figure 15:
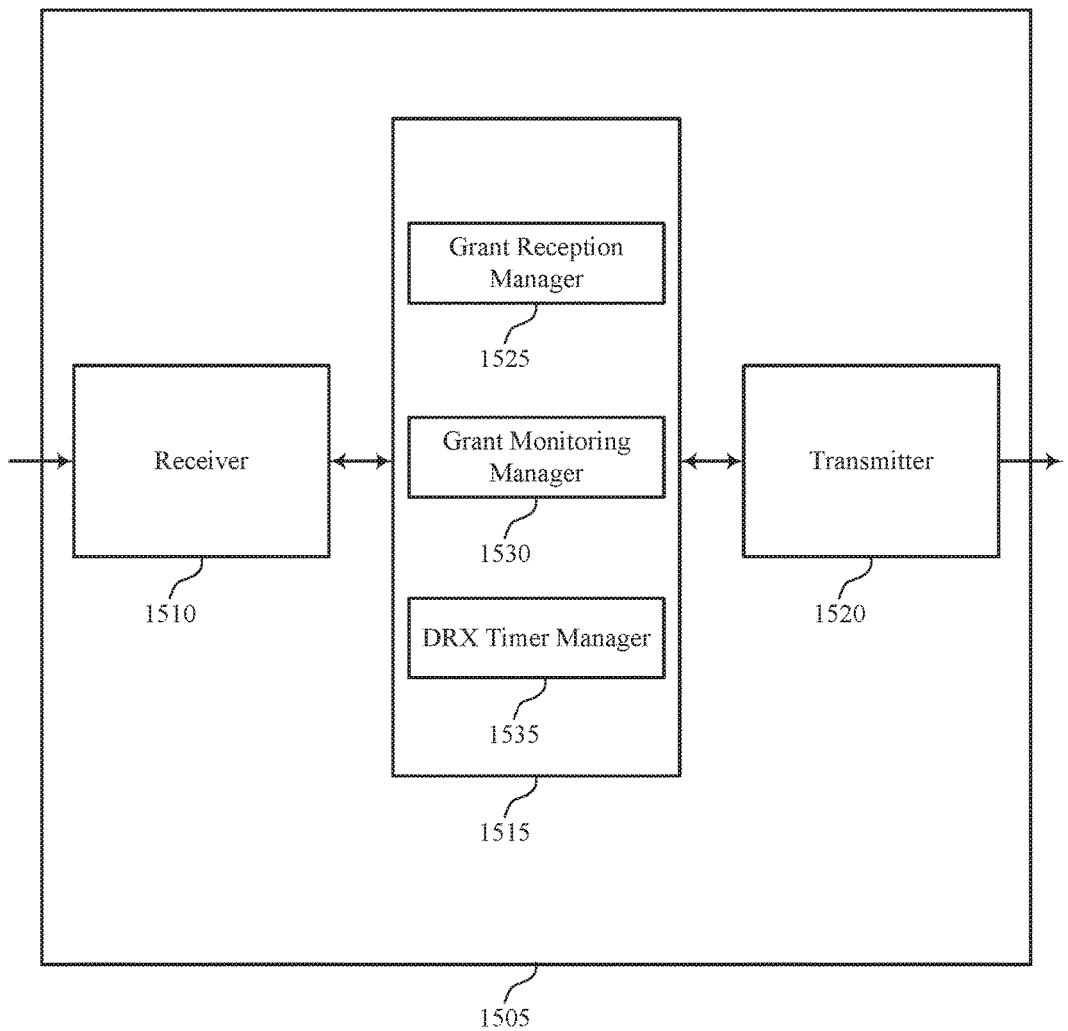

FIG. 15 shows a block diagram 1500 of a wireless device 1505 that supports wakeup techniques for improved connected mode discontinuous reception in accordance with various aspects of the present disclosure. Wireless device 1505 may be an example of aspects of a wireless device 1405 or a UE 115 as described with reference to FIGS. 1 and 14. Wireless device 1505 may include receiver 1510, UE DRX manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to wakeup techniques for improved connected mode discontinuous reception, etc.). Information may be passed on to other components of the device. The receiver 1510 may be an example of aspects of the transceiver 1735 described with reference to FIG. 17.

UE DRX manager 1515 may be an example of aspects of the UE DRX manager 1715 described with reference to FIG. 17. UE DRX manager 1515 may also include grant reception manager 1525, grant monitoring manager 1530, and DRX timer manager 1535.

Grant reception manager 1525 may receive from a base station while the UE is in a discontinuous reception state, an indication that a grant of resources will be transmitted by the base station to the UE and receive the grant of resources. In some cases, the indication that the grant of resources will be transmitted by the base station and the grant of resources are received is during the same discontinuous reception cycle.

Grant monitoring manager 1530 may monitor for the grant of resources based on receiving the indication that the grant of resources will be transmitted and monitor for the indicated grant of resources during the on state. In some examples, grant monitoring manager 1530 may also identify that the grant of resources indicated by the received indication was not received by the UE.

DRX timer manager 1535 may reset a discontinuous reception cycle timer based at least in part on identifying that the grant of resources indicated by the received indication was not received by the UE. DRX timer manager 1535 may further initiate a short discontinuous reception cycle or a long discontinuous reception cycle based at least in part on the identification.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1735 described with reference to FIG. 17. The transmitter 1520 may include a single antenna, or it may include a set of antennas.

Figure 16:
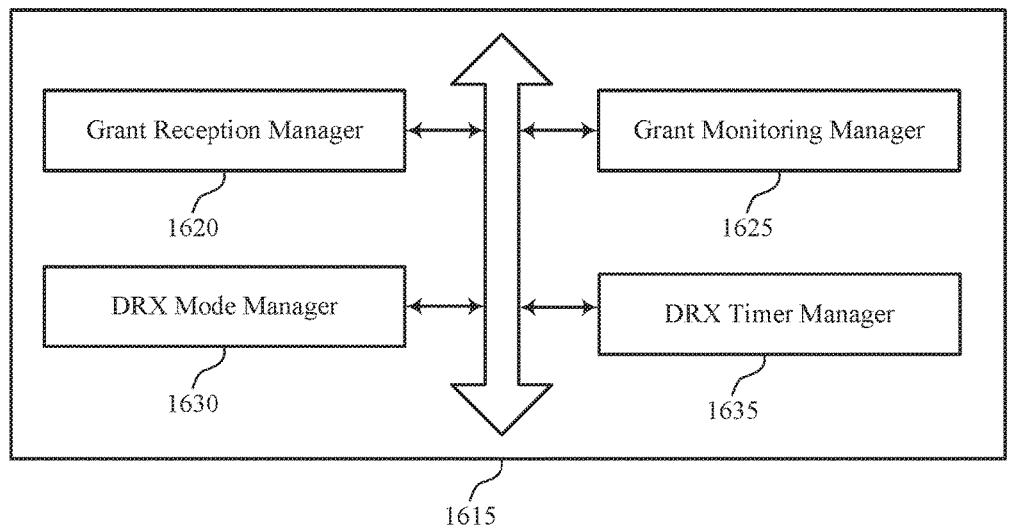

FIG. 16 shows a block diagram 1600 of a UE DRX manager 1615 that supports wakeup techniques for improved connected mode discontinuous reception in accordance with various aspects of the present disclosure. The UE DRX manager 1615 may be an example of aspects of a UE DRX manager 1715 described with reference to FIGS. 14, 15, and 17. The UE DRX manager 1615 may include grant reception manager 1620, grant monitoring manager 1625, DRX mode manager 1630, and DRX timer manager 1635. Each of these modules may communicate, directly or indirectly, with one another (e.g., via one or more buses).

Grant reception manager 1620 may receive, from a base station while the UE is in a discontinuous reception state, an indication that a grant of resources will be transmitted by the base station to the UE and receive the grant of resources. In some cases, the indication that the grant of resources will be transmitted by the base station and the grant of resources are received is during the same discontinuous reception cycle.

Grant monitoring manager 1625 may monitor for the grant of resources based on receiving the indication that the grant of resources will be transmitted and monitor for the indicated grant of resources during the on state. In some cases, grant monitoring manager 1625 may identify that the grant of resources indicated by the received indication was not received by the UE.

DRX mode manager 1630 may enter an on state of the discontinuous reception state based on the received indication that the grant of resources will be transmitted, or identifying the presence of data to be transmitted on a downlink or an uplink, or a combination thereof.

In some other cases, DRX mode manager 1630 may reset a discontinuous reception inactivity timer based on receiving the grant of resources, or reset a discontinuous reception cycle timer based on receiving the indication that the grant of resources will be transmitted, or identify the presence of data to be transmitted on a downlink or an uplink, or a combination thereof In some cases, DRX mode manager 1630 may switch between a first discontinuous reception mode associated with the discontinuous reception state and a second discontinuous reception mode, or identify a traffic pattern for the UE 115, or switch between the first discontinuous reception mode and the second discontinuous reception mode based on the identified traffic pattern, or determine that the base station transmitted data to the UE 115 during a preceding discontinuous reception cycle according to a first discontinuous reception mode, or operate in the first discontinuous reception mode in a current discontinuous reception cycle based on the determination, or a combination thereof.

DRX timer manager 1635 may reset a discontinuous reception cycle timer based at least in part on identifying that the grant of resources indicated by the received indication was not received by the UE. DRX timer manager 1635 may further initiate a short discontinuous reception cycle or a long discontinuous reception cycle based at least in part on the identification.

Figure 17:
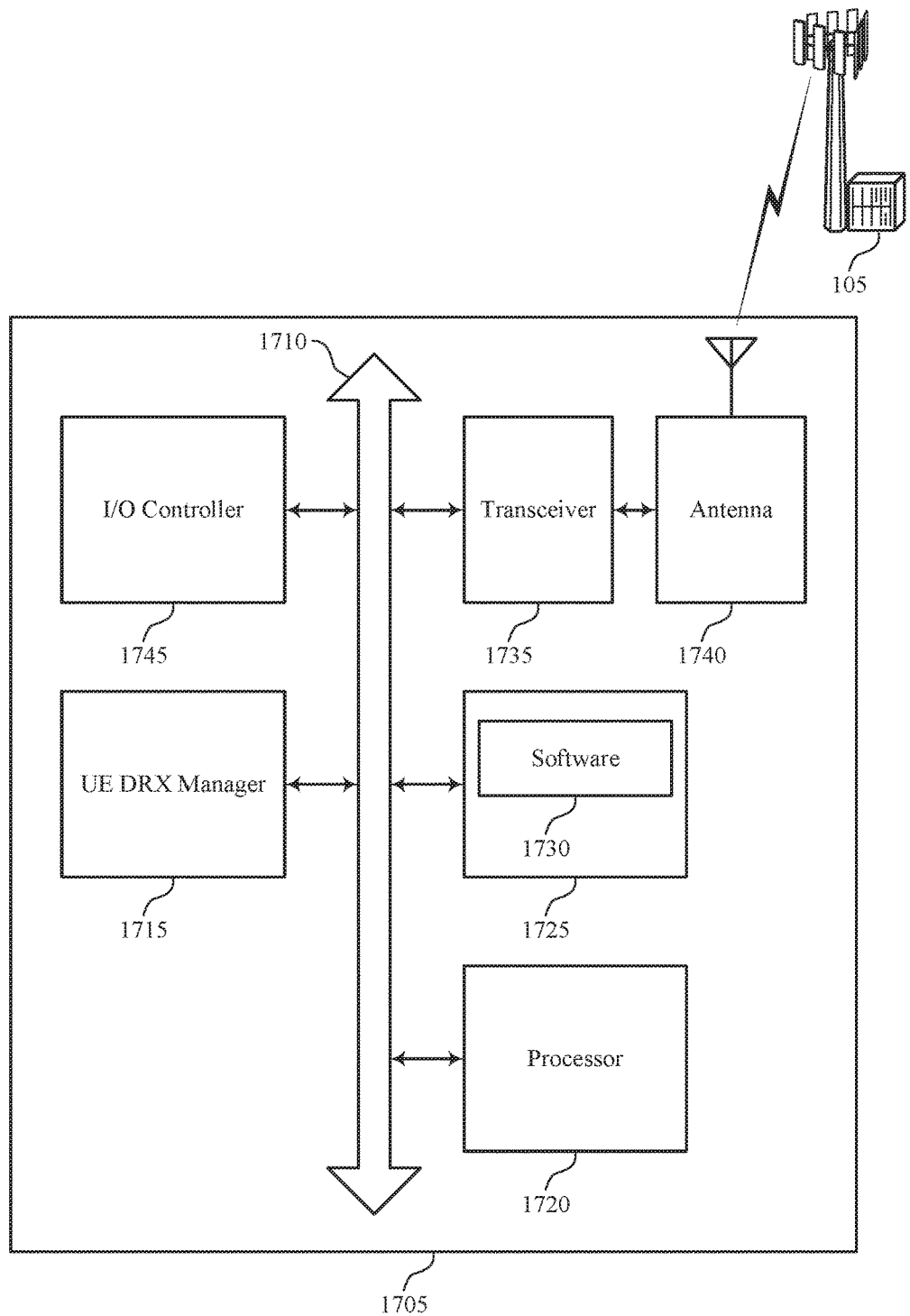
FIG. 17 illustrates a block diagram of a system including a UE that supports wakeup techniques for improved connected mode discontinuous reception, in accordance with one or more aspects of the present disclosure.

FIG. 17 shows a diagram of a system 1700 including a device 1705 that supports Pre-WU Schemes for C-DRX Improvement in accordance with various aspects of the present disclosure. Device 1705 may be an example of or include the components of UE 115 as described above, e.g., with reference to FIG. 1. Device 1705 may include components for bi-directional voice and data communications including components for transmitting and receiving communications, including UE DRX manager 1715, processor 1720, memory 1725, software 1730, transceiver 1735, antenna 1740, and I/O controller 1745. These components may be in electronic communication via one or more busses (e.g., bus 1710). Device 1705 may communicate wirelessly with one or more base stations 105.

Processor 1720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting wakeup techniques for improved connected mode discontinuous reception).

Memory 1725 may include RAM and ROM. The memory 1725 may store computer-readable, computer-executable software 1730 including instructions that, when executed, cause the processor to perform various functions described herein. In some cases, the memory 1725 may contain, among other things, a BIOS which may control basic hardware and/or software operation such as the interaction with peripheral components or devices.

Software 1730 may include code to implement aspects of the present disclosure, including code to support Pre-WU Schemes for C-DRX Improvement. Software 1730 may be stored in a non-transitory computer-readable medium such as system memory or other memory. In some cases, the software 1730 may not be directly executable by the processor but may cause a computer (e.g., when compiled and executed) to perform functions described herein.

Transceiver 1735 may communicate bi-directionally, via one or more antennas, wired, or wireless links as described above. For example, the transceiver 1735 may represent a wireless transceiver and may communicate bi-directionally with another wireless transceiver. The transceiver 1735 may also include a modem to modulate the packets and provide the modulated packets to the antennas for transmission, and to demodulate packets received from the antennas.

In some cases, the wireless device may include a single antenna 1740. However, in some cases the device may have more than one antenna 1740, which may be capable of concurrently transmitting or receiving multiple wireless transmissions.

I/O controller 1745 may manage input and output signals for device 1705. I/O controller 1745 may also manage peripherals not integrated into device 1705. In some cases, I/O controller 1745 may represent a physical connection or port to an external peripheral. In some cases, I/O controller 1745 may utilize an operating system such as iOS®, ANDROID®, MS-DOS®, MS-WINDOWS®, OS/2®, UNIX®, LINUX®, or another known operating system.

Figure 18:
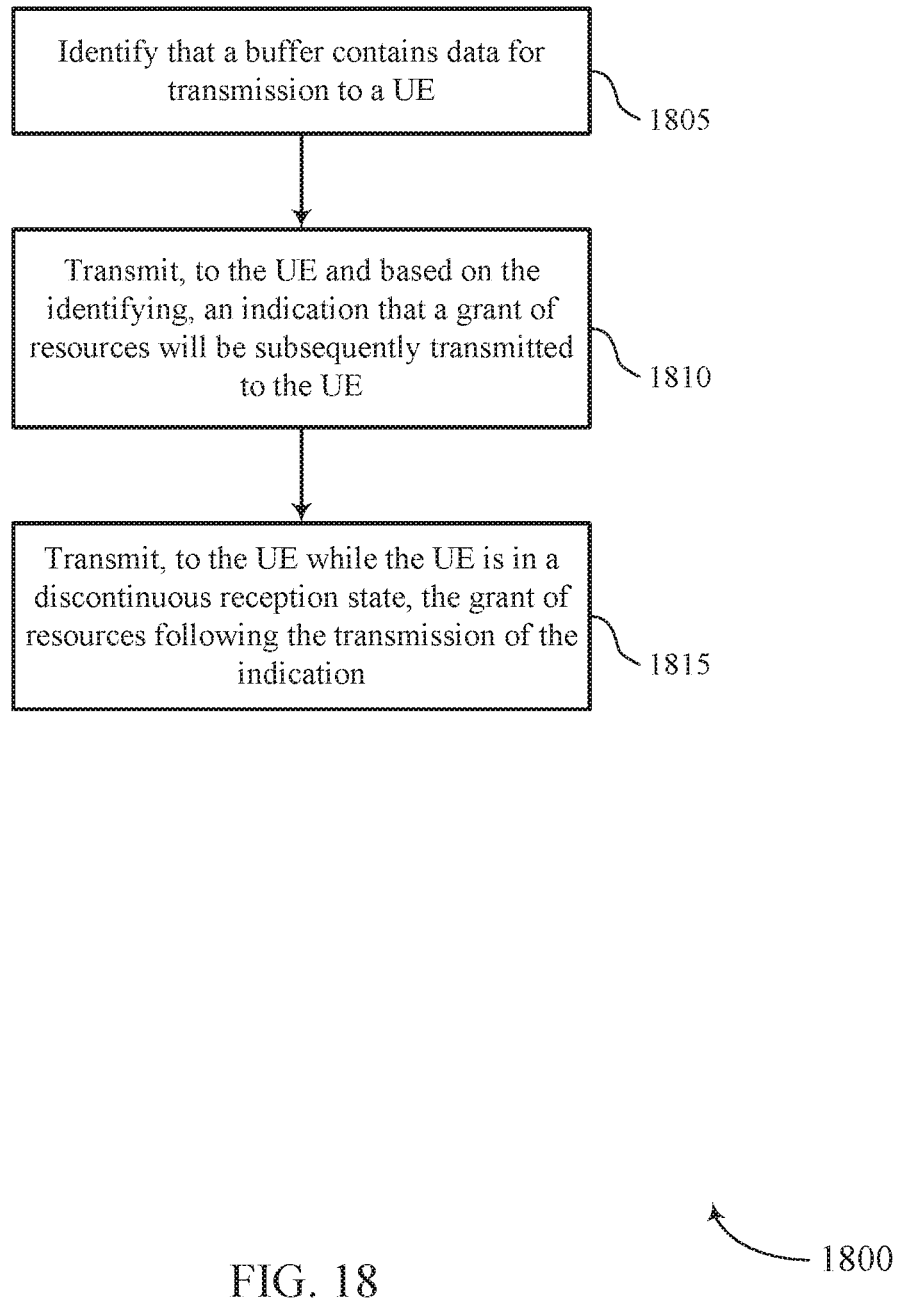
FIGS. 18 through 25 illustrate methods for wakeup techniques for improved connected mode discontinuous reception, in accordance with one or more aspects of the present disclosure.

FIG. 18 shows a flowchart illustrating a method 1800 for wakeup techniques for improved connected mode discontinuous reception in accordance with various aspects of the present disclosure. The operations of method 1800 may be implemented by a base station 105 or its components as described herein. For example, the operations of method 1800 may be performed by a base station DRX manager as described with reference to FIGS. 10 through 13. In some examples, a base station 105 may execute a set of codes to control the functional elements of the device to perform the functions described below. Additionally or alternatively, the base station 105 may perform aspects the functions described below using special-purpose hardware.

At block 1805 the base station 105 may identify that a buffer contains data for transmission to a UE. The operations of block 1805 may be performed according to the methods described with reference to FIGS. 1 through 9. In some examples, aspects of the operations of block 1805 may be performed by a buffer content identifier as described with reference to FIGS. 10 through 13.

At block 1810 the base station 105 may transmit, to the UE and based at least in part on the identifying, an indication that a grant of resources will be subsequently transmitted to the UE. The operations of block 1810 may be performed according to the methods described with reference to FIGS. 1 through 9. In some examples, aspects of the operations of block 1810 may be performed by a grant indication communication manager as described with reference to FIGS. 10 through 13.

At block 1815 the base station 105 may transmit, to the UE while the UE is in a discontinuous reception state, the grant of resources following the transmission of the indication. The operations of block 1815 may be performed according to the methods described with reference to FIGS. 1 through 9. In some examples, aspects of the operations of block 1815 may be performed by a grant communication manager as described with reference to FIGS. 10 through 13.

Figure 19:
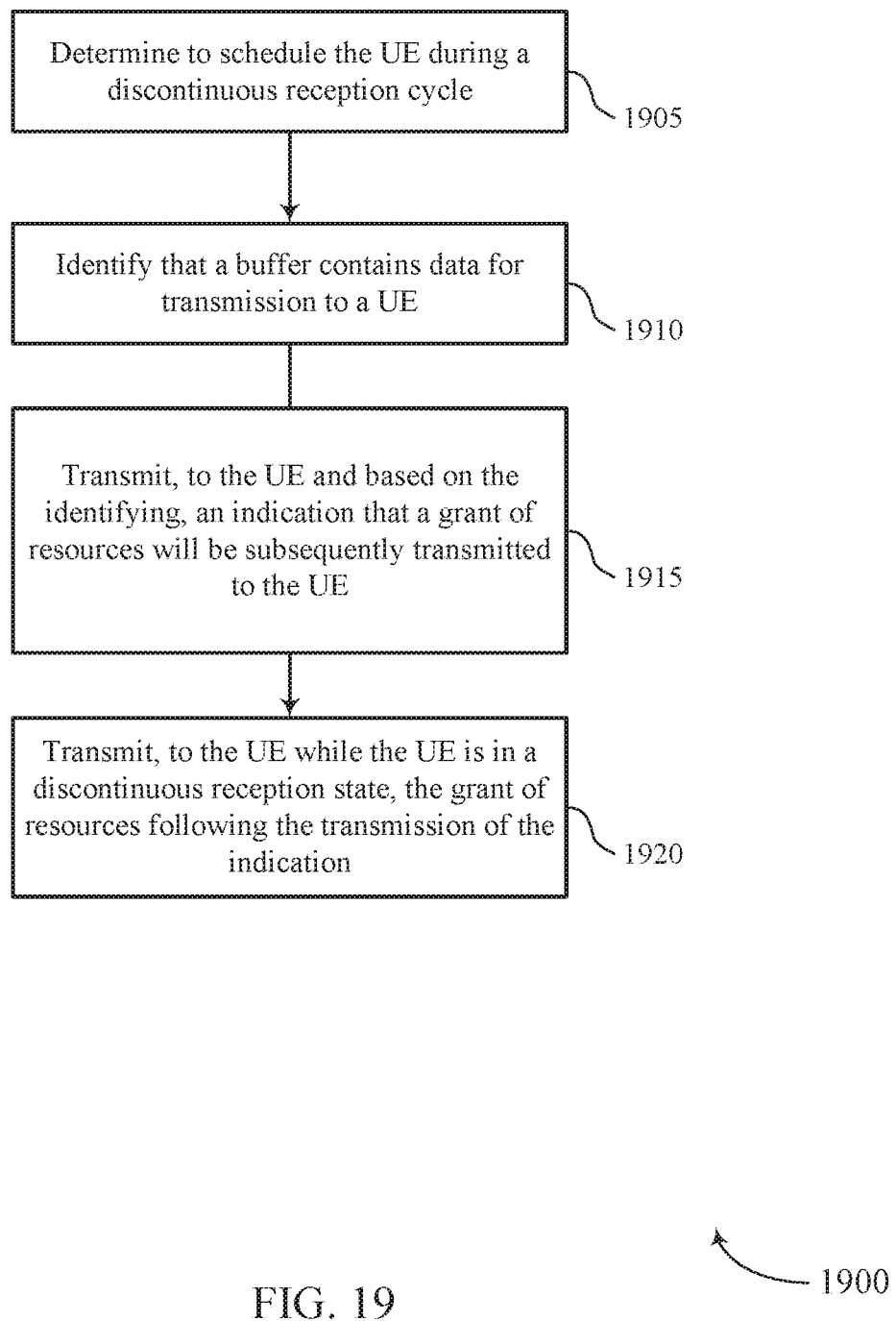

FIG. 19 shows a flowchart illustrating a method 1900 for wakeup techniques for improved connected mode discontinuous reception in accordance with various aspects of the present disclosure. The operations of method 1900 may be implemented by a base station 105 or its components as described herein. For example, the operations of method 1900 may be performed by a base station DRX manager as described with reference to FIGS. 10 through 13. In some examples, a base station 105 may execute a set of codes to control the functional elements of the device to perform the functions described below. Additionally or alternatively, the base station 105 may perform aspects the functions described below using special-purpose hardware.

At block 1905 the base station 105 may determine to schedule the UE during a discontinuous reception cycle. The operations of block 1905 may be performed according to the methods described with reference to FIGS. 1 through 9. In some examples, aspects of the operations of block 1905 may be performed by a scheduling manager as described with reference to FIGS. 10 through 13.

At block 1910 the base station 105 may identify that a buffer contains data for transmission to a UE. The operations of block 1910 may be performed according to the methods described with reference to FIGS. 1 through 9. In some examples, aspects of the operations of block 1910 may be performed by a buffer content identifier as described with reference to FIGS. 10 through 13.

At block 1915 the base station 105 may transmit, to the UE and based at least in part on the identifying, an indication that a grant of resources will be subsequently transmitted to the UE, wherein the indication indicates that the UE is to wake up for a duration of time. The operations of block 1915 may be performed according to the methods described with reference to FIGS. 1 through 9. In some examples, aspects of the operations of block 1915 may be performed by a grant indication communication manager as described with reference to FIGS. 10 through 13.

At block 1920 the base station 105 may transmit, to the UE while the UE is in a discontinuous reception state, the grant of resources following the transmission of the indication. The operations of block 1920 may be performed according to the methods described with reference to FIGS. 1 through 9. In some examples, aspects of the operations of block 1920 may be performed by a grant communication manager as described with reference to FIGS. 10 through 13.

Figure 20:
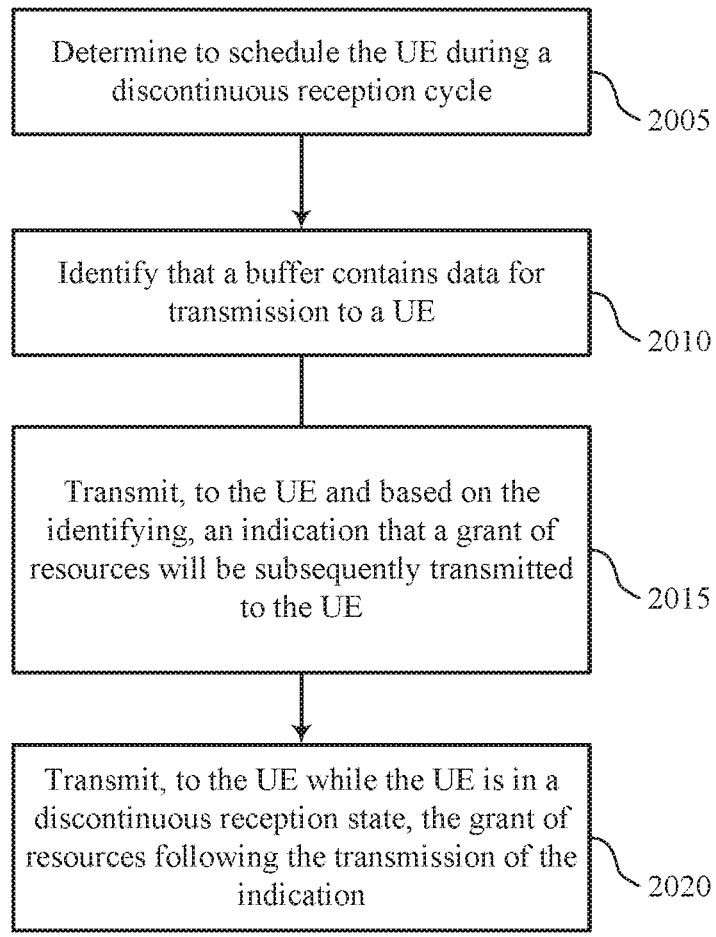

FIG. 20 shows a flowchart illustrating a method 2000 for wakeup techniques for improved connected mode discontinuous reception in accordance with various aspects of the present disclosure. The operations of method 2000 may be implemented by a base station 105 or its components as described herein. For example, the operations of method 2000 may be performed by a base station DRX manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may determine to schedule the UE during a discontinuous reception cycle. The operations of block 2005 may be performed according to the methods described with reference to FIGS. 1 through 9. In some examples, aspects of the operations of block 2005 may be performed by a scheduling manager as described with reference to FIGS. 10 through 13.

At block 2010 the base station 105 may identify that a buffer contains data for transmission to a UE. The operations of block 2010 may be performed according to the methods described with reference to FIGS. 1 through 9. In some examples, aspects of the operations of block 2010 may be performed by a buffer content identifier as described with reference to FIGS. 10 through 13.

At block 2015 the base station 105 may transmit, to the UE and based at least in part on the identifying, an indication that a grant of resources will be subsequently transmitted to the UE, wherein the indication indicates a time for the UE to wake up to listen for the grant of resources. The operations of block 2015 may be performed according to the methods described with reference to FIGS. 1 through 9. In some examples, aspects of the operations of block 2015 may be performed by a grant indication communication manager as described with reference to FIGS. 10 through 13.

At block 2020 the base station 105 may transmit, to the UE while the UE is in a discontinuous reception state, the grant of resources following the transmission of the indication. The operations of block 2020 may be performed according to the methods described with reference to FIGS. 1 through 9. In certain examples, aspects of the operations of block 2020 may be performed by a grant communication manager as described with reference to FIGS. 10 through 13.

Figure 21:
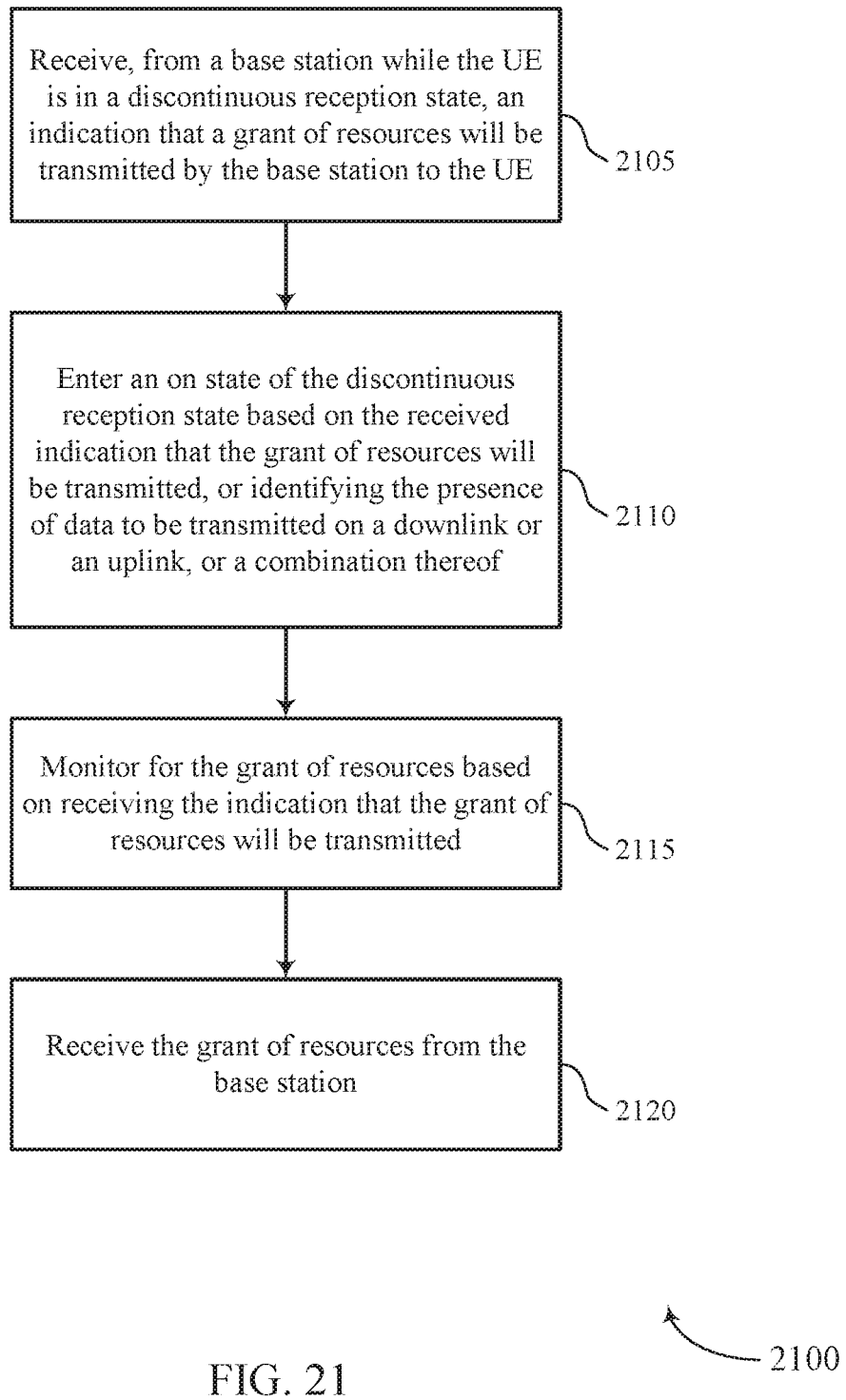

FIG. 21 shows a flowchart illustrating a method 2100 for wakeup techniques for improved connected mode discontinuous reception in accordance with various aspects of the present disclosure. The operations of method 2100 may be implemented by a UE 115 or its components as described herein. For example, the operations of method 2100 may be performed by a UE DRX manager as described with reference to FIGS. 14 through 17. In some examples, a UE 115 may execute a set of codes to control the functional elements of the device to perform the functions described below. Additionally or alternatively, the UE 115 may perform aspects the functions described below using special-purpose hardware.

At block 2105 the UE 115 may receive, from a base station while the UE is in a discontinuous reception state, an indication that a grant of resources will be transmitted by the base station to the UE. The operations of block 2105 may be performed according to the methods described with reference to FIGS. 1 through 9. In some examples, aspects of the operations of block 2105 may be performed by a grant reception manager as described with reference to FIGS. 14 through 17.

At block 2110 the UE 115 may enter an on state of the discontinuous reception state based at least in part on the received indication that the grant of resources will be transmitted, or identifying the presence of data to be transmitted on a downlink or an uplink, or a combination thereof. The operations of block 2110 may be performed according to the methods described with reference to FIGS. 1 through 9. In some examples, aspects of the operations of block 2110 may be performed by a DRX mode manager as described with reference to FIGS. 14 through 17.

At block 2115 the UE 115 may monitor for the grant of resources based at least in part on receiving the indication that the grant of resources will be transmitted. The operations of block 2115 may be performed according to the methods described with reference to FIGS. 1 through 9. In some examples, aspects of the operations of block 2115 may be performed by a grant monitoring manager as described with reference to FIGS. 14 through 17.

At block 2120 the UE 115 may receive the grant of resources from the base station 105 based at least in part on monitoring for the grant of resources. The operations of block 2120 may be performed according to the methods described with reference to FIGS. 1 through 9. In some examples, aspects of the operations of block 2120 may be performed by a UE DRX manager, grant monitoring manager, or grant reception manager as described with reference to FIGS. 14 through 17.

Figure 22:
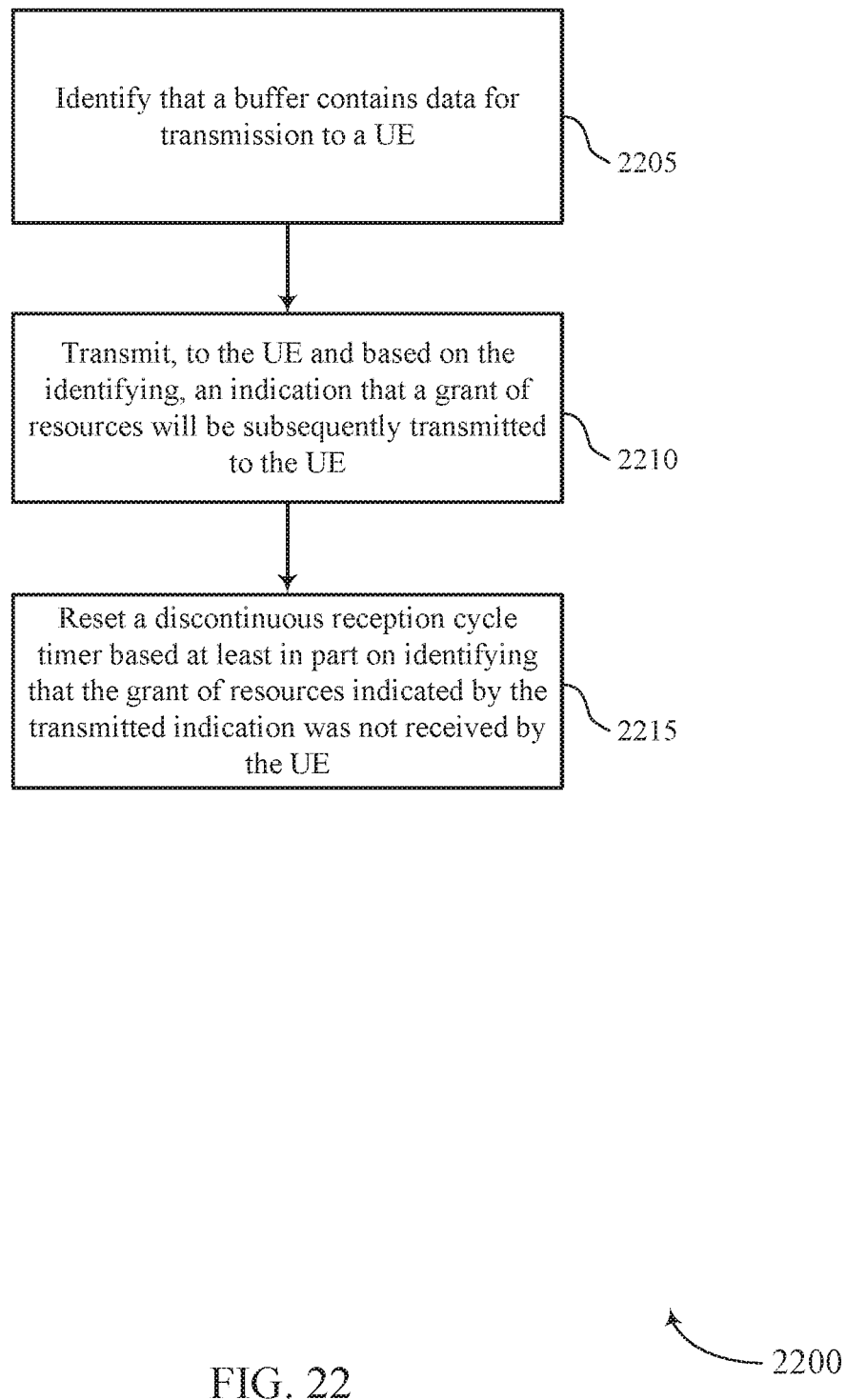

FIG. 22 shows a flowchart illustrating a method 2200 for wakeup techniques for improved connected mode discontinuous reception in accordance with aspects of the present disclosure. The operations of method 2200 may be implemented by a base station 105 or its components as described herein. For example, the operations of method 2200 may be performed by a by a base station DRX manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 2205 the UE 115 may identify that a buffer contains data for transmission to a UE. The operations of block 2205 may be performed according to the methods described herein. In some examples, aspects of the operations of block 2205 may be performed by a buffer content identifier as described with reference to FIGS. 10 through 13.

At block 2210 the UE 115 may transmit, to the UE and based at least in part on the identifying, an indication that a grant of resources will be subsequently transmitted to the UE. The operations of block 2210 may be performed according to the methods described herein. In some examples, aspects of the operations of block 2210 may be performed by a grant indication communication manager as described with reference to FIGS. 10 through 13.

At block 2215 the UE 115 may reset a discontinuous reception cycle timer based at least in part on identifying that the grant of resources indicated by the transmitted indication was not received by the UE. The operations of block 2215 may be performed according to the methods described herein. In some examples, aspects of the operations of block 2215 may be performed by a grant indication communication manager as described with reference to FIGS. 10 through 13.

Figure 23:
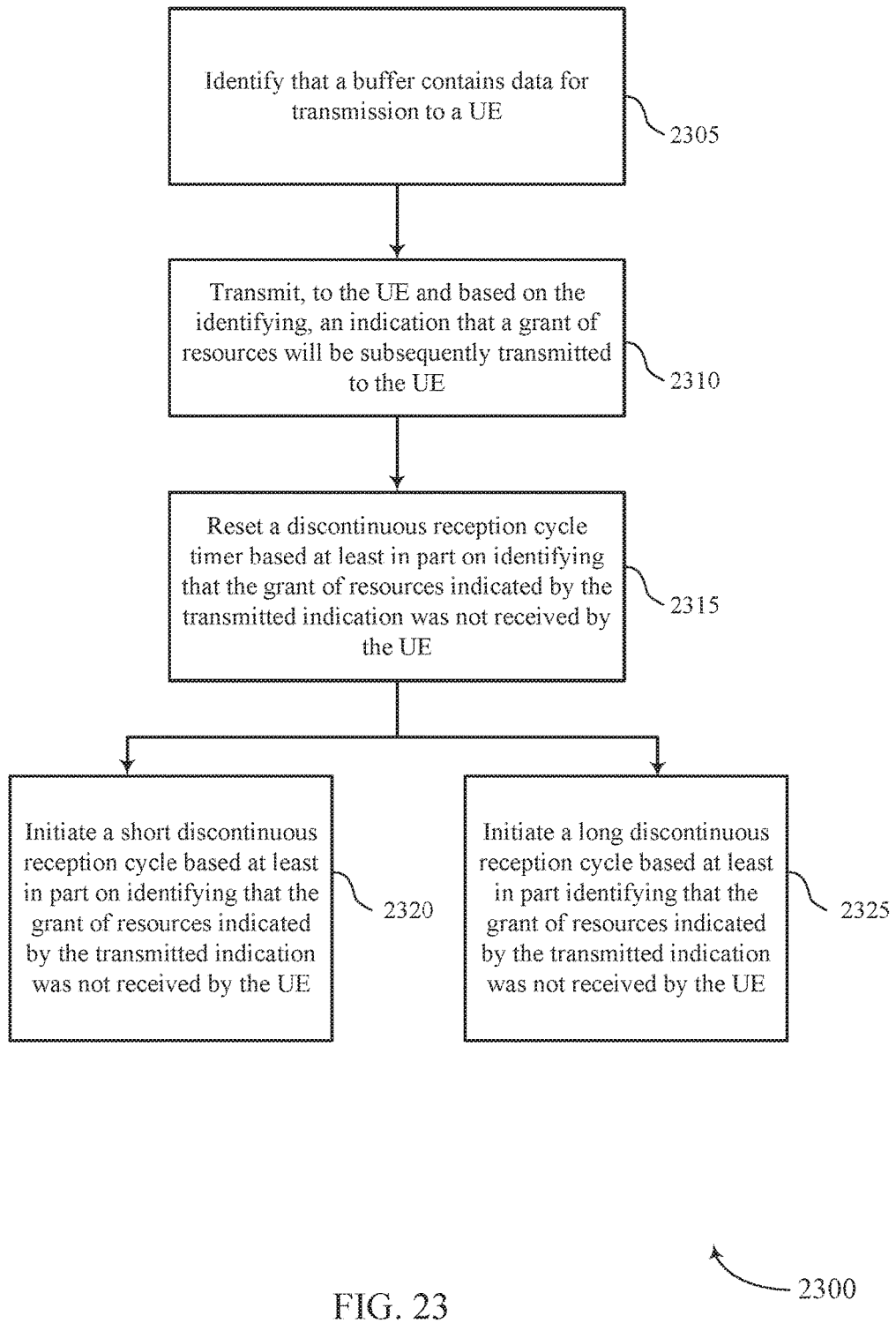

FIG. 23 shows a flowchart illustrating a method 2300 for wakeup techniques for improved connected mode discontinuous reception in accordance with aspects of the present disclosure. The operations of method 2300 may be implemented by a base station 105 or its components as described herein. For example, the operations of method 2300 may be performed by a base station DRX manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 2305 the UE 115 may identify that a buffer contains data for transmission to a UE. The operations of block 2305 may be performed according to the methods described herein. In some examples, aspects of the operations of block 2305 may be performed by a DRX buffer content identifier as described with reference to FIGS. 10 through 13.

At block 2310 the UE 115 may transmit, to the UE and based at least in part on the identifying, an indication that a grant of resources will be subsequently transmitted to the UE. The operations of block 2310 may be performed according to the methods described herein. In some examples, aspects of the operations of block 2310 may be performed by a grant indication communication manager as described with reference to FIGS. 10 through 13.

At block 2315 the UE 115 may reset a discontinuous reception cycle timer based at least in part on identifying that the grant of resources indicated by the transmitted indication was not received by the UE. The operations of block 2315 may be performed according to the methods described herein. In some examples, aspects of the operations of block 2315 may be performed by a DRX timer manager as described with reference to FIGS. 10 through 13.

In some examples, at block 2320 the UE 115 may initiate a short discontinuous reception cycle based at least in part on identifying that the grant of resources indicated by the transmitted indication was not received by the UE. Alternatively, in some examples, at block 2325 the UE 115 may initiate a long discontinuous reception cycle based at least in part on identifying that the grant of resources indicated by the transmitted indication was not received by the UE. The operations of block 2320 and block 2325 may be performed according to the methods described herein. In some examples, aspects of the operations of block 2320 and block 2325 may be performed by a DRX timer manager as described with reference to FIGS. 10 through 13.

Figure 24:
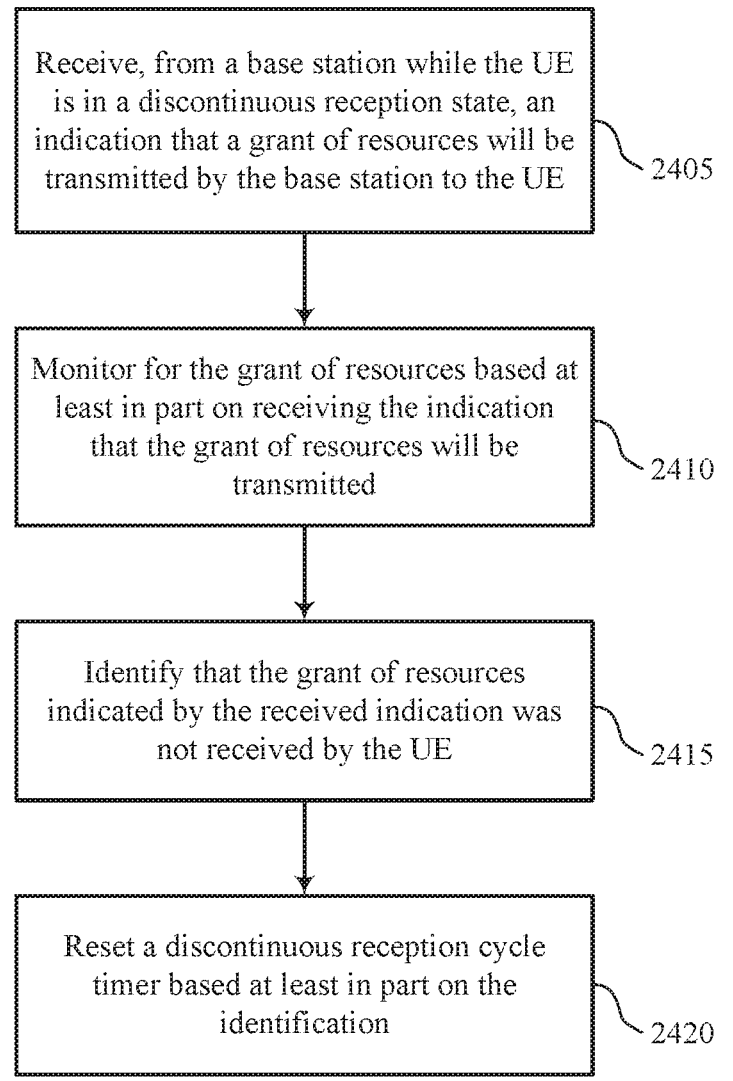

FIG. 24 shows a flowchart illustrating a method 2400 for wakeup techniques for improved connected mode discontinuous reception in accordance with aspects of the present disclosure. The operations of method 2400 may be implemented by a UE 115 or its components as described herein. For example, the operations of method 2400 may be performed by a UE DRX manager as described with reference to FIGS. 14 through 17. In some examples, a UE 115 may execute a set of codes to control the functional elements of the device to perform the functions described below. Additionally or alternatively, the UE 115 may perform aspects of the functions described below using special-purpose hardware.

At block 2405 the UE 115 may receive, from a base station while the UE is in a discontinuous reception state, an indication that a grant of resources will be transmitted by the base station to the UE. The operations of block 2405 may be performed according to the methods described herein. In some examples, aspects of the operations of block 2405 may be performed by a grant reception manager as described with reference to FIGS. 14 through 17.

At block 2410 the UE 115 may monitor for the grant of resources based at least in part on receiving the indication that the grant of resources will be transmitted. The operations of block 2410 may be performed according to the methods described herein. In some examples, aspects of the operations of block 2410 may be performed by a grant monitoring manager as described with reference to FIGS. 14 through 17.

At block 2415 the UE 115 may identify that the grant of resources indicated by the received indication was not received by the UE. The operations of block 2415 may be performed according to the methods described herein. In some examples, aspects of the operations of block 2415 may be performed by a DRX monitoring manager as described with reference to FIGS. 14 through 17.

At block 2420 the UE 115 may reset a discontinuous reception cycle timer based at least in part on the identification. The operations of block 2420 may be performed according to the methods described herein. In some examples, aspects of the operations of block 2420 may be performed by a DRX timer manager as described with reference to FIGS. 14 through 17.

Figure 25:
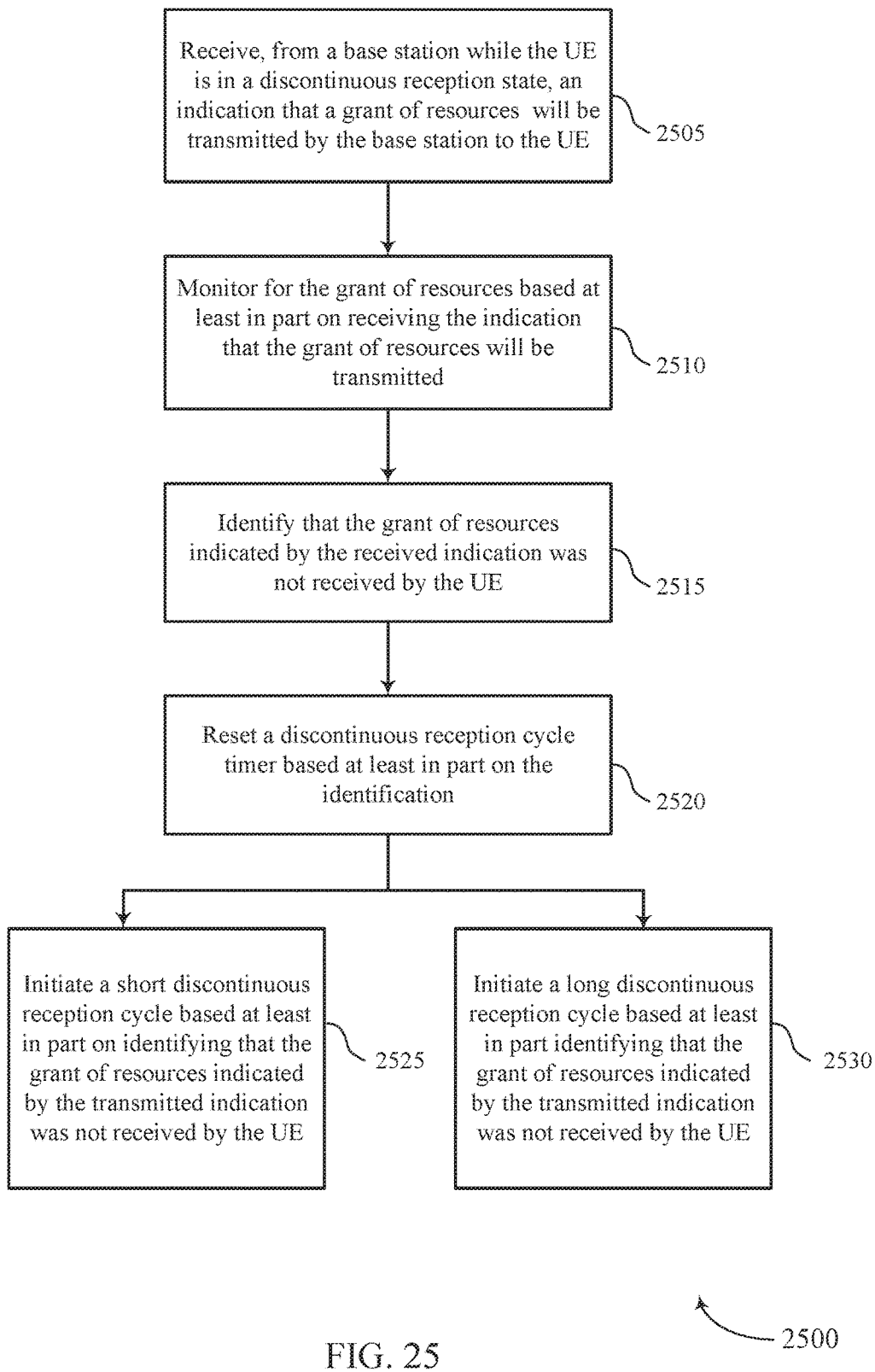

FIG. 25 shows a flowchart illustrating a method 2500 for wakeup techniques for improved connected mode discontinuous reception in accordance with aspects of the present disclosure. The operations of method 2500 may be implemented by a UE 115 or its components as described herein. For example, the operations of method 2500 may be performed by a UE DRX manager as described with reference to FIGS. 14 through 17. In some examples, a UE 115 may execute a set of codes to control the functional elements of the device to perform the functions described below. Additionally or alternatively, the UE 115 may perform aspects of the functions described below using special-purpose hardware.

At block 2505 the UE 115 may receive, from a base station while the UE is in a discontinuous reception state, an indication that a grant of resources will be transmitted by the base station to the UE. The operations of block 2505 may be performed according to the methods described herein. In some examples, aspects of the operations of block 2505 may be performed by a grant reception manager as described with reference to FIGS. 14 through 17.

At block 2510 the UE 115 may monitor for the grant of resources based at least in part on receiving the indication that the grant of resources will be transmitted. The operations of block 2510 may be performed according to the methods described herein. In some examples, aspects of the operations of block 2510 may be performed by a grant reception manager as described with reference to FIGS. 14 through 17.

At block 2515 the UE 115 may identify that the grant of resources indicated by the received indication was not received by the UE. The operations of block 2515 may be performed according to the methods described herein. In some examples, aspects of the operations of block 2515 may be performed by a grant monitoring manager as described with reference to FIGS. 14 through 17.

At block 2520 the UE 115 may reset a discontinuous reception cycle timer based at least in part on the identification. The operations of block 2520 may be performed according to the methods described herein. In some examples, aspects of the operations of block 2520 may be performed by a DRX timer manager as described with reference to FIGS. 14 through 17.

In some examples, at block 2525, the UE 115 may initiate a short discontinuous reception cycle based at least in part on identifying that the grant of resources indicated by the transmitted indication was not received by the UE. Alternatively, at block 2530, the UE 115 may initiate a long discontinuous reception cycle based at least in part on identifying that the grant of resources indicated by the transmitted indication was not received by the UE. The operations of block 2525 and block 2530 may be performed according to the methods described herein. In some examples, aspects of the operations of block 2525 and block 2530 may be performed by a DRX timer manager as described with reference to FIGS. 14 through 17.

It should be noted that the methods described above describe possible implementations, and that the operations may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system"

and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are releases of UMTS that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

Also, as used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a base station, comprising:
    identifying that a buffer contains data for transmission to a user equipment (UE);
    transmitting, to the UE and based at least in part on the identifying, an indication that a grant of resources will be subsequently transmitted to the UE, the indication including a time for the UE to wake up to listen for the grant of resources; and
    transmitting, to the UE while the UE is in a discontinuous reception state, the grant of resources following the transmission of the indication.

2. The method of claim 1, wherein the indication that the grant of resources will be subsequently transmitted to the UE and the grant of resources are transmitted during the same discontinuous reception cycle.

3. The method of claim 1, further comprising:
    determining to schedule the UE during a discontinuous reception cycle; wherein
    the indication indicates that the UE is to wake up for a duration of time.

4. The method of claim 1, wherein the indication indicates that the UE is to wake up for a duration of time.

5. The method of claim 1, further comprising:
    determining a discontinuous reception mode for the UE to use to receive transmissions from the base station; and
    transmitting, to the UE, a mode indicator indicating the determined discontinuous reception mode.

6. The method of claim 1, further comprising:
    identifying a set of UEs from among a plurality of UEs; and
    transmitting a group indication that one or more grants of resources will be transmitted for the identified set of UEs.

7. The method of claim 6, wherein identifying the set of UEs is based at least in part on an amount of data for transmission associated with respective buffers associated with each of the set of UEs.

8. The method of claim 1, further comprising:
transmitting the indication that the grant of resources will be transmitted to the UE in a beginning subframe of a discontinuous reception cycle.

9. A method for wireless communication at a user equipment (UE), comprising:
receiving, from a base station while the UE is in a discontinuous reception state, an indication that a grant of resources will be transmitted by the base station to the UE, the indication including a time for the UE to wake up to listen for the grant of resources;
monitoring for the grant of resources based at least in part on receiving the indication that the grant of resources will be transmitted; and
receiving the grant of resources from the base station.

10. The method of claim 9, wherein the indication that the grant of resources will be transmitted by the base station and the grant of resources are received during the same discontinuous reception cycle.

11. The method of claim 9, further comprising:
entering an on state of the discontinuous reception state based at least in part on the received indication that the grant of resources will be transmitted, or identifying a presence of data to be transmitted on a downlink or an uplink, or a combination thereof; and
monitoring for the indicated grant of resources during the on state.

12. The method of claim 11, further comprising:
resetting a discontinuous reception cycle timer based at least in part on receiving the indication that the grant of resources will be transmitted, or identifying the presence of data to be transmitted on a downlink or an uplink, or a combination thereof.

13. The method of claim 11, further comprising:
receiving the grant of resources; and
resetting a discontinuous reception inactivity timer based at least in part on receiving the grant of resources.

14. The method of claim 9, further comprising:
switching between a first discontinuous reception mode associated with the discontinuous reception state and a second discontinuous reception mode.

15. The method of claim 14, further comprising:
identifying a traffic pattern for the UE; and
switching between the first discontinuous reception mode and the second discontinuous reception mode based at least in part on the identified traffic pattern.

16. The method of claim 14, further comprising:
determining that the base station transmitted data to the UE during a preceding discontinuous reception cycle according to the first discontinuous reception mode; and
operating in the first discontinuous reception mode in a current discontinuous reception cycle based at least in part on the determination.

17. A method for wireless communication at a base station, comprising:
identifying that a buffer contains data for transmission to a user equipment (UE);
transmitting, to the UE and based at least in part on the identifying, an indication that a grant of resources will be subsequently transmitted to the UE; and
resetting a discontinuous reception cycle timer based at least in part on identifying that the grant of resources indicated by the transmitted indication was not received by the UE.

18. The method of claim 17, wherein resetting the discontinuous reception cycle timer further comprises:
initiating a short discontinuous reception cycle based at least in part on identifying that the grant of resources indicated by the transmitted indication was not received by the UE.

19. The method of claim 17, wherein resetting the discontinuous reception cycle timer further comprises:
initiating a long discontinuous reception cycle based at least in part on identifying that the grant of resources indicated by the transmitted indication was not received by the UE.

20. The method of claim 17, wherein identifying that the grant of resources indicated by the transmitted indication was not received by the UE comprises:
identifying, at the base station, that the grant of resources indicated by the transmitted indication was not transmitted by the base station.

21. The method of claim 17, wherein identifying that the grant of resources indicated by the transmitted indication was not received by the UE comprises:
receiving an indication from the UE that the grant of resources indicated by the transmitted indication was not received by the UE.

22. The method of claim 17, wherein the indication that the grant of resources will be subsequently transmitted to the UE and the grant of resources are transmitted during the same discontinuous reception cycle.

23. The method of claim 17, wherein the indication indicates that the UE is to wake up for a duration of time.

24. The method of claim 17, further comprising:
determining a discontinuous reception mode for the UE to use to receive transmissions from the base station; and
transmitting, to the UE, a mode indicator indicating the determined discontinuous reception mode.

25. A method for wireless communication at a user equipment (UE), comprising:
receiving, from a base station while the UE is in a discontinuous reception state, an indication that a grant of resources will be transmitted by the base station to the UE;
monitoring for the grant of resources based at least in part on receiving the indication that the grant of resources will be transmitted;
identifying that the grant of resources indicated by the received indication was not received by the UE; and
resetting a discontinuous reception cycle timer based at least in part on the identification.

26. The method of claim 25, wherein resetting the discontinuous reception cycle timer further comprises:
initiating a short discontinuous reception cycle based at least in part on the identification.

27. The method of claim 25, wherein resetting the discontinuous reception cycle timer further comprises:
initiating a long discontinuous reception cycle based at least in part on the identification.

28. The method of claim 25, further comprising:
identifying a traffic pattern for the UE; and
switching between a first discontinuous reception mode associated with the discontinuous reception state and a second discontinuous reception mode based at least in part on the identified traffic pattern.

29. The method of claim 25, further comprising:
determining that the base station transmitted data to the UE during a preceding discontinuous reception cycle according to a first discontinuous reception mode; and operating in the first discontinuous reception mode in a current discontinuous reception cycle based at least in part on the determination.

\* \* \* \* \*